(12) United States Patent
Liu et al.

(10) Patent No.: US 11,245,786 B2
(45) Date of Patent: Feb. 8, 2022

(54) RECOMMENDATION METHOD AND TERMINAL

(71) Applicant: Huawei Technologies Co., Ltd., Shenzhen (CN)

(72) Inventors: Mohan Liu, Shanghai (CN); Li Zhou, Shanghai (CN); Jiyong Jiang, Shanghai (CN); Xiyong Wang, Shenzhen (CN); Renzhi Yang, Shanghai (CN); Kang Sun, Shanghai (CN); Tao Fan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/648,155

(22) PCT Filed: Sep. 18, 2017

(86) PCT No.: PCT/CN2017/102084
§ 371 (c)(1),
(2) Date: Mar. 17, 2020

(87) PCT Pub. No.: WO2019/051835
PCT Pub. Date: Mar. 21, 2019

(65) Prior Publication Data
US 2020/0259947 A1    Aug. 13, 2020

(51) Int. Cl.
*H04M 3/00*     (2006.01)
*H04M 1/72454*  (2021.01)
(Continued)

(52) U.S. Cl.
CPC ........ *H04M 1/72454* (2021.01); *G06F 9/453* (2018.02); *H04M 1/72451* (2021.01)

(58) Field of Classification Search
None
See application file for complete search history.

(56) References Cited

U.S. PATENT DOCUMENTS 9,009,823 B1   4/2015 Ismael et al.
9,460,608 B2  10/2016 Dave et al.
(Continued)

FOREIGN PATENT DOCUMENTS

CN   101917295 A   12/2010
CN   102799751 A   11/2012
(Continued)

*Primary Examiner* — Jinsong Hu
*Assistant Examiner* — Alexander J Yi
(74) *Attorney, Agent, or Firm* — Conley Rose, P.C.

(57) ABSTRACT

A recommendation method applied to a terminal includes a rule platform with system-level permission, the rule platform is configured to save system resources and remind a user of a function of an application. The rule platform obtains a first event and a first rule related to the first event from a rule base. The rule platform includes the rule base including a rule and each rule includes a condition. The rule platform updates a matching status of a first condition corresponding to the first event in the first rule The terminal displays a recommendation result corresponding to the first rule when a matching status of each condition in the first rule indicates that the matching is successful. The first rule is one of the rule related to the first event.

20 Claims, 23 Drawing Sheets

(51) Int. Cl.
*G06F 9/451* (2018.01)
*H04M 1/72451* (2021.01)

(56) References Cited

U.S. PATENT DOCUMENTS

| | | | |
|---|---|---|---|
| 9,893,904 B2 | 2/2018 | Roberts et al. | |
| 2008/0201206 A1* | 8/2008 | Pokorney | G06Q 30/0201 |
| | | | 705/7.29 |
| 2008/0250323 A1 | 10/2008 | Huff | |
| 2009/0183178 A1* | 7/2009 | Imai | H04N 21/8405 |
| | | | 719/318 |
| 2010/0161659 A1* | 6/2010 | Takeyasu | G06F 16/951 |
| | | | 707/770 |
| 2013/0007747 A1 | 1/2013 | Chi et al. | |
| 2013/0290944 A1 | 10/2013 | Menon et al. | |
| 2014/0344709 A1 | 11/2014 | Roberts et al. | |
| 2015/0074259 A1* | 3/2015 | Ansari | H04L 67/02 |
| | | | 709/224 |
| 2015/0309723 A1 | 10/2015 | Zhu | |
| 2016/0191415 A1* | 6/2016 | Reddy | H04L 67/00 |
| | | | 709/226 |
| 2017/0026247 A1* | 1/2017 | Singhal | H04L 41/12 |
| 2017/0303077 A1* | 10/2017 | Li | H04B 5/00 |

FOREIGN PATENT DOCUMENTS

| | | |
|---|---|---|
| CN | 102855532 A | 1/2013 |
| CN | 103347118 A | 10/2013 |
| CN | 103744576 A | 4/2014 |
| CN | 105516272 A | 4/2016 |
| CN | 105677774 A | 6/2016 |
| CN | 105893441 A | 8/2016 |
| CN | 106021600 A | 10/2016 |
| CN | 106126388 A | 11/2016 |
| CN | 107122220 A | 9/2017 |

* cited by examiner

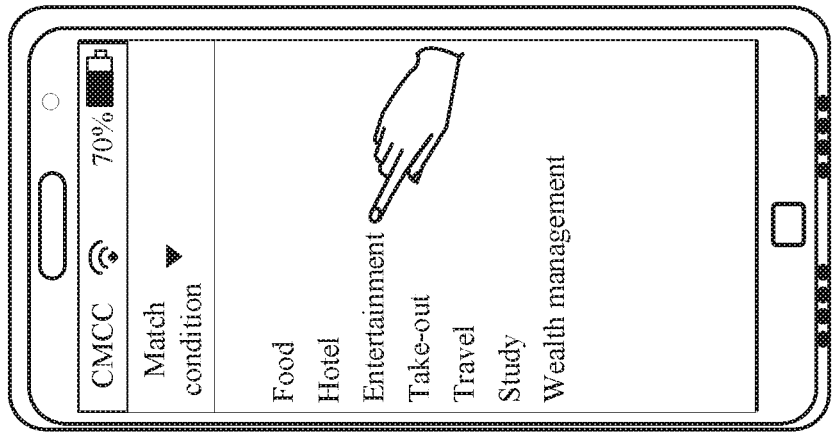
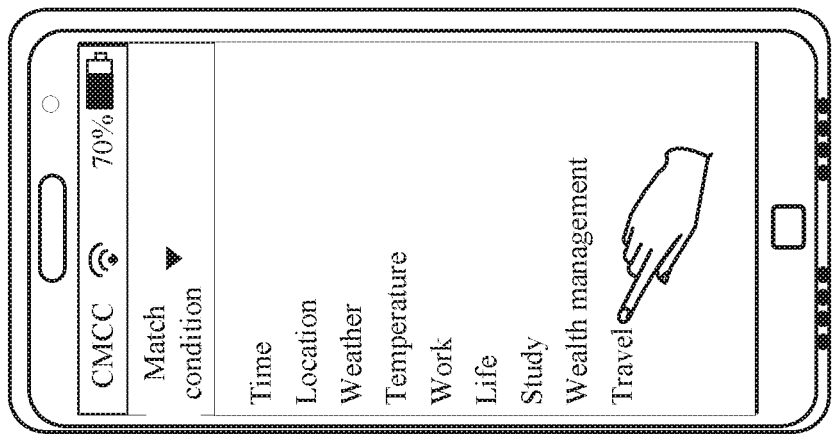
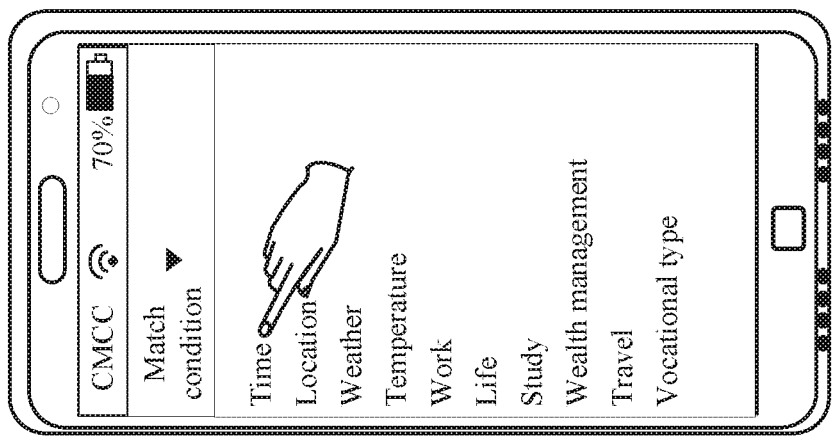
FIG. 3C-1

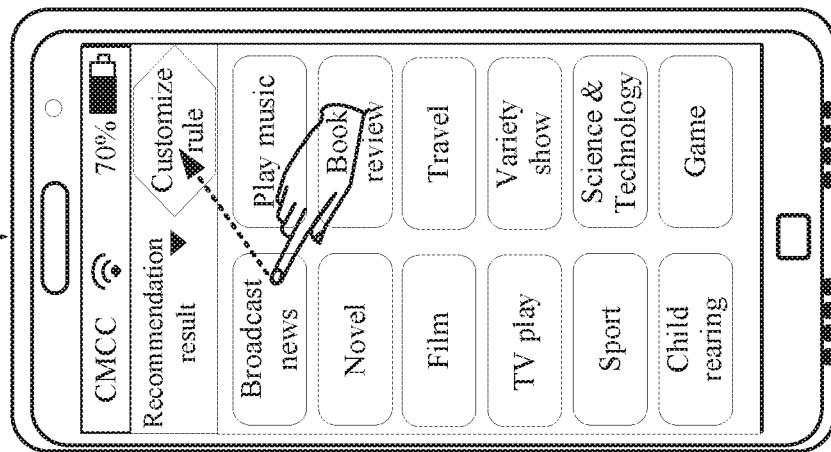
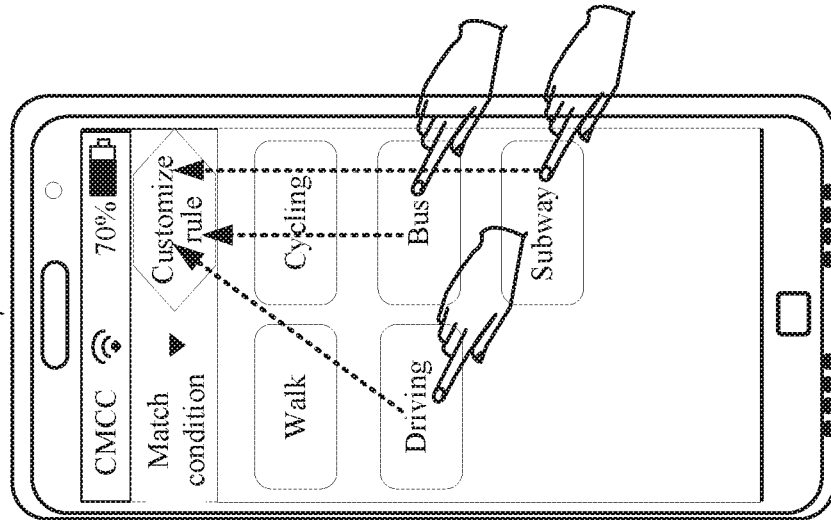
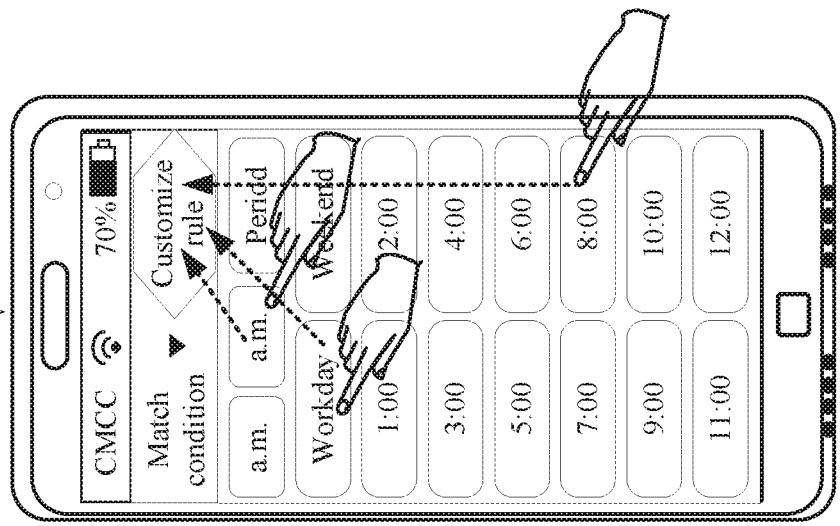
FIG. 3C-2

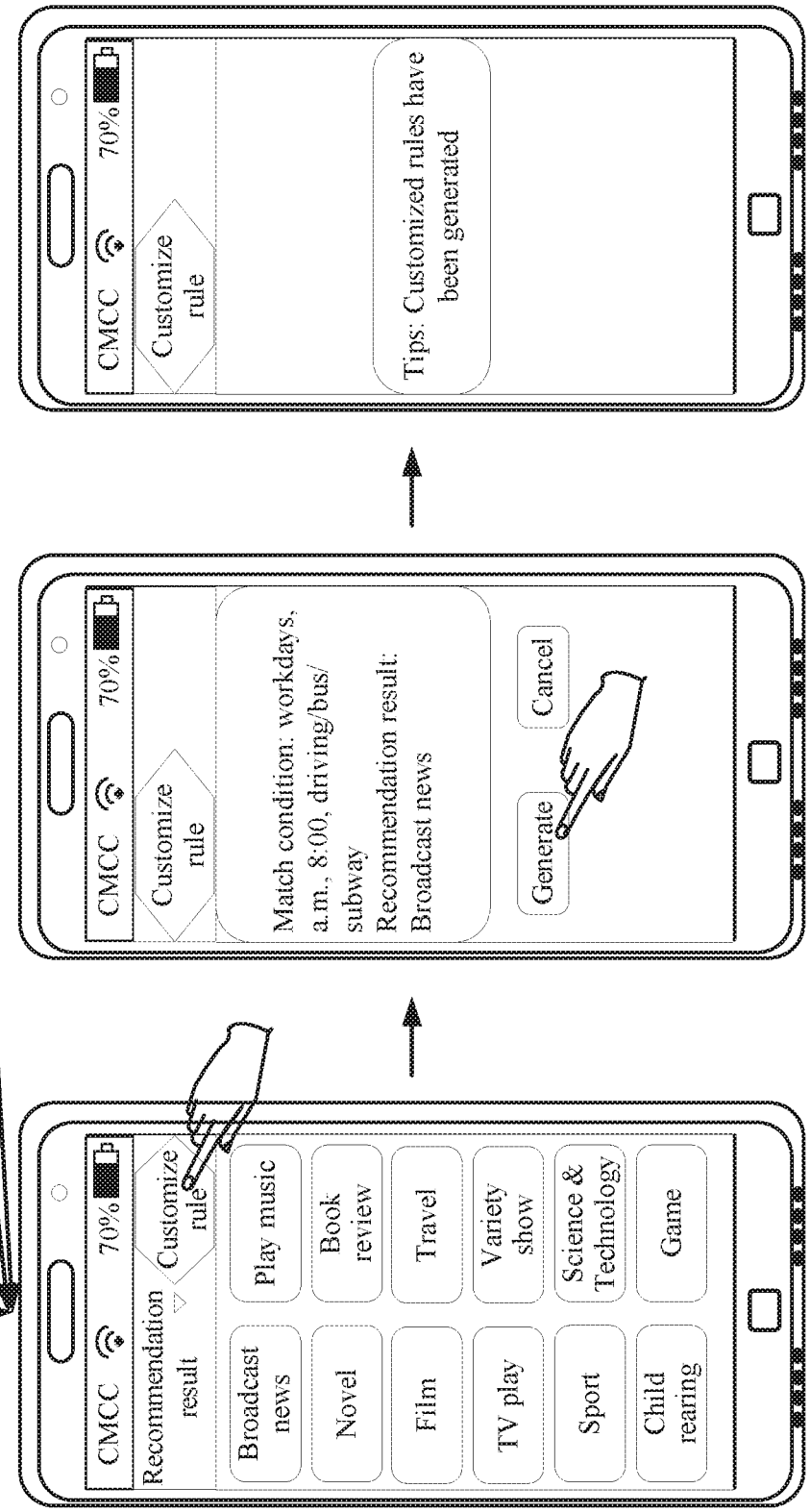

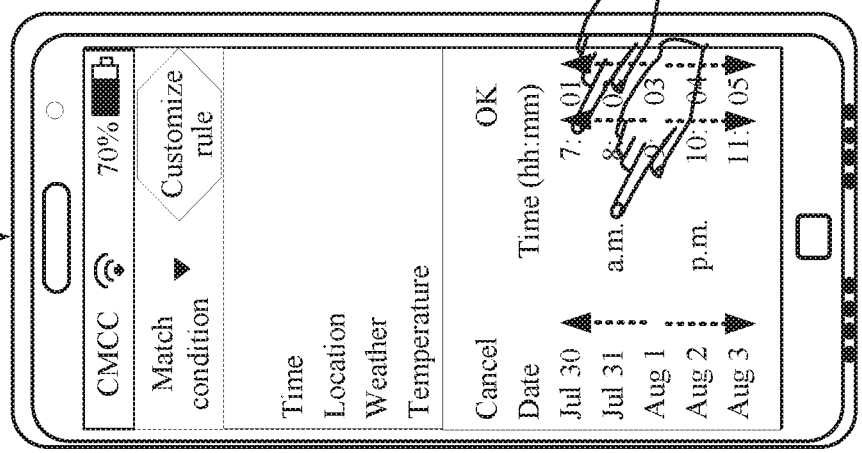
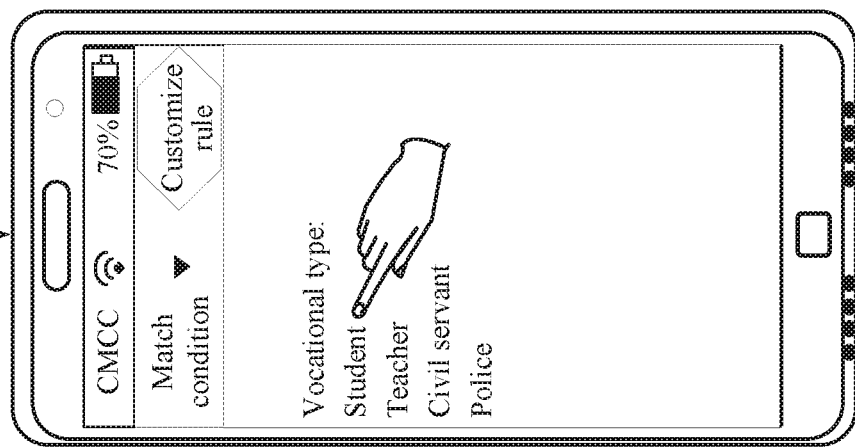
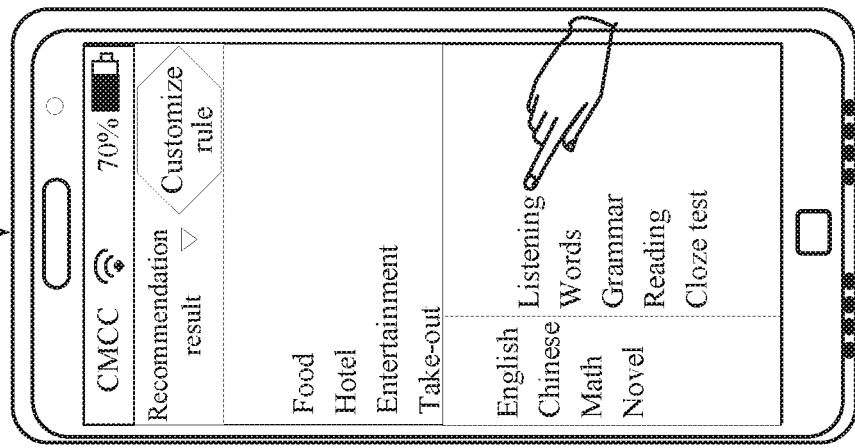
FIG. 3D-2

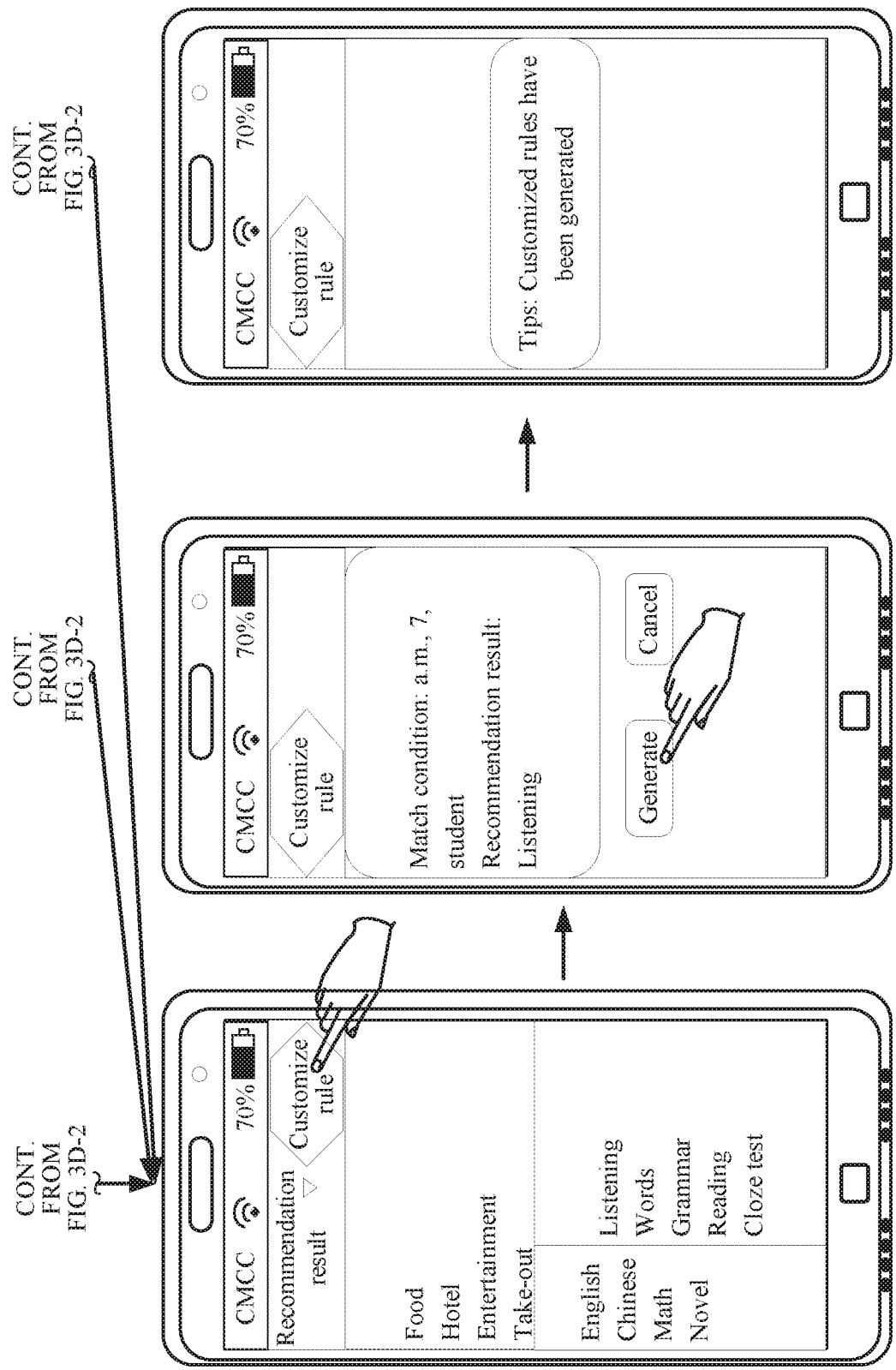

RECOMMENDATION METHOD AND TERMINAL

CROSS-REFERENCE TO RELATED APPLICATIONS

This application is a U.S. National Stage of International Patent Application No. PCT/CN2017/102084 filed on Sep. 18, 2017, which is hereby incorporated by reference in its entirety.

TECHNICAL FIELD

Embodiments of this application relate to the terminal application field, and in particular, to a recommendation method and a terminal.

BACKGROUND

Terminal intelligence is an inevitable development trend. Rule matching is an intelligent method. An application can define a lot of rules, and then match an event according to a rule, to provide a recommendation result. However, each application defines rules, performs rule-based matching, and recommends a result on its own. Consequently, a same system resource may be repeatedly invoked by a plurality of applications, causing additional power consumption. For example, various sensor data is obtained.

SUMMARY

Embodiments of this application provide a recommendation method and a terminal, to save system resources and remind a user of a recommendation result. The recommendation result may be some functions of an application, or may be an activity reminder, making the terminal more intelligent.

A first aspect of the embodiments of this application provides a recommendation method, applied to a terminal, where the terminal includes a rule platform, and the rule platform has system-level permission, and the method may include: monitoring and obtaining, by the rule platform, a first event; obtaining, by the rule platform, at least one rule related to the first event from a rule base, where the rule platform includes the rule base, the rule base includes at least one rule, each rule includes at least one condition, and it should be understood that, the at least one rule related to the first event may include all rules related to the first event; updating, by the rule platform, a matching status of a first condition corresponding to the first event in the at least one rule related to the first event; and when a matching status of each condition in a first rule indicates that matching is successful, displaying, by the terminal, a recommendation result corresponding to the first rule, where the first rule is one of the at least one rule related to the first event. It should be noted that, a rule is defined as: condition+recommendation result. To be specific, a recommendation result is output correspondingly only after conditions of one rule are all matched.

In this embodiment of this application, any one or more applications of the terminal may register a rule with the rule platform, and the rule platform performs unified management, and may store the registered rule to the rule base. Each application may register one or more rules with the rule platform. When the rule platform detects the first event, all the rules related to the first event may be obtained from the rule base, and the matching status of the first condition corresponding to the first event in all the rules is updated. If the matching status of each condition indicates that the matching is successful, the rule platform may output the recommendation result corresponding to the first rule, and the terminal displays the recommendation result. When there are at least two rules related to the first event, system resources can be saved, because it is necessary to monitor the first event only once for the at least two rules. However, in the prior art, it is necessary to monitor the first event at least twice. In addition, a user may be reminded to use a function of the application, reminded of an activity, or the like, making the terminal more intelligent and user-friendly, and improving user experience.

Optionally, in some embodiments of this application, before the obtaining, by the rule platform, at least one rule related to the first event from a rule base, the method may further include: receiving, by the rule platform, the first rule sent by a first application; and storing, by the rule platform, the first rule to the rule base. In other words, the rule platform can receive and store the rules registered by any one or more applications, and can manage the registered rules together. When an event is detected, the rule platform may update a matching status of a corresponding condition in all rules related to the event, thereby improving utilization of system resources.

Optionally, in some embodiments of this application, the displaying, by the terminal, a recommendation result corresponding to the first rule may include: sending, by the rule platform, the recommendation result to a second application; and displaying, by the second application, the recommendation result, where the second application is the same as or different from the first application. When outputting the recommendation result, the rule platform may proactively send the recommendation result to the application; and the application receives and displays the recommendation result. This provides a feasible solution for the embodiments of this application.

Optionally, in some embodiments of this application, the displaying, by the terminal, a recommendation result corresponding to the first rule may include: storing, by the rule platform, the recommendation result; and obtaining, by a second application, the recommendation result from the rule platform and displaying the recommendation result, where the second application is the same as or different from the first application. When the matching status of each condition in the first rule indicates success, the rule platform may store the recommendation result corresponding to the first rule, and the second application proactively obtains the recommendation result from the rule platform, and then displays the recommendation result. This provides a feasible solution.

Optionally, in some embodiments of this application, the first rule includes a second condition related to a user portrait, and before the displaying, by the terminal, a recommendation result corresponding to the first rule, the method may further include: obtaining, by the rule platform, a current user portrait from a user portrait platform of the terminal; and updating, by the rule platform, a matching status of the second condition based on the current user portrait. When the rule platform detects the first event, the rule platform may further send the first event to the user portrait platform. The user portrait platform may analyze whether the user portrait is updated; and if the user portrait is updated, feed back the updated user portrait, that is, the current user portrait, to the rule platform. The second condition in the at least one rule related to the first event is matched. It can be understood that, not all conditions in the rules include the user portrait. A relationship between the user portrait and the rule is described. To be specific, according to some habits of the user, the recommendation result is displayed correspondingly based on some habits and hobbies of the user, thereby improving user experience.

Optionally, in some embodiments of this application, the method may further include: sending, by the terminal, a query request to a server, where the query request is used to query whether any rule is updated; receiving, by the terminal, an updated rule sent by the server; updating, by the terminal, a rule related to the updated rule in the rule base. The rules stored in the rule platform are not changeless, but can be updated. In this solution, the rules are updated through a cloud server. The rule platform may periodically send a query request to the server. If a rule is updated, the server may feed back the updated rule, and the rule platform may update the rule related to the updated rule in the rule base, so that the rules stored in the rule base of the rule platform are more flexible and can be updated.

Optionally, in some embodiments of this application, when the matching status of each condition in the first rule indicates that the matching is successful, the displaying, by the terminal, a recommendation result corresponding to the first rule may include: when matching statuses of all conditions in the first rule and a second rule indicate that matching is successful, and a priority of the first rule is higher than that of the second rule, displaying, by the terminal, the recommendation result corresponding to the first rule, where the second rule is one of the at least one rule related to the first event. It should be understood that, when there is more than one rule that can match the condition successfully, and if the recommendation results are all displayed on the application, interference may be caused to the user. Therefore, this solution proposes that the recommendation result can be displayed based on the priority of the rule, and a recommendation result corresponding to a rule with a highest priority is displayed. This provides an optional implementation solution.

Optionally, in some embodiments of this application, the terminal includes the rule platform and a graphical user interface, where the rule platform includes an interface layer and a rule engine; the rule engine includes the rule base, a personal knowledge base, a rule status unit, a recommendation result candidate set, and the user portrait platform, where the first rule includes the second condition related to the user portrait:

the interface layer is configured to obtain the first event:

the rule status unit is configured to obtain the at least one rule related to the first event from the rule base, and update the matching status of the first condition corresponding to the first event in the at least one rule related to the first event;

the personal knowledge base is configured to store the first event, and the matching status of the first condition in the at least one rule related to the first event; and is further configured to obtain the current user portrait from the user portrait platform, and update the matching status of the second condition based on the current user portrait;

the recommendation result candidate set is configured to: when the matching status of each condition in the first rule indicates that the matching is successful, store the recommendation result corresponding to the first rule; and the graphical user interface is configured to display the recommendation result.

In this embodiment of this application, a general description is made on the several functional modules included in the terminal, so that the technical solutions of this application are more complete.

A second aspect of the embodiments of this application provides a terminal that has functions of saving system resources and reminding a user of a recommendation result. The functions may be implemented by hardware or by executing corresponding software by hardware. The hardware or the software includes one or more modules corresponding to the foregoing functions.

A third aspect of the embodiments of this application provides a terminal. The terminal may include: a memory, a processor, and a display, where the memory, the processor, and the display are connected through a bus:

the memory is configured to store a rule base, where the rule base includes at least one rule, and each rule includes at least one condition;

the processor is configured to obtain a first event, obtain at least one rule related to the first event from the rule base, and update a matching status of a first condition corresponding to the first event in the at least one rule related to the first event;

the processor is further configured to: when a matching status of each condition in a first rule indicates that matching is successful, output a recommendation result corresponding to the first rule, where the first rule is one of the at least one rule related to the first event; and the display is configured to display a recommendation result corresponding to the first rule.

Optionally, in some embodiments of this application, the processor is further configured to receive the first rule sent by a first application, and store the first rule to the rule base.

Optionally, in some embodiments of this application, that the processor is further configured to output a recommendation result corresponding to the first rule specifically includes: the processor sends the recommendation result to a second application; and the display is specifically configured to display the recommendation result, where the second application is the same as or different from the first application.

Optionally, in some embodiments of this application, that the processor outputs a recommendation result corresponding to the first rule specifically includes: the processor sends the recommendation result to the memory;

the memory is further configured to store the recommendation result; and the display is specifically configured to obtain the recommendation result from the memory and display the recommendation result, where a second application is the same as or different from the first application.

Optionally, in some embodiments of this application, the first rule includes a second condition related to a user portrait; and the processor is further configured to obtain a current user portrait from a user portrait platform of the terminal, and update a matching status of the second condition based on the current user portrait.

Optionally, in some embodiments of this application, the processor is further configured to: send a query request to a server, where the query request is used to query whether any rule is updated; receive an updated rule sent by the server; and update a rule related to the updated rule in the rule base.

Optionally, in some embodiments of this application, that the processor outputs a recommendation result corresponding to the first rule specifically includes: when matching statuses of all conditions in the first rule and a second rule indicate that matching is successful, and a priority of the first rule is higher than that of the second rule, the processor outputs the recommendation result corresponding to the first rule, where the second rule is one of the at least one rule related to the first event.

A fourth aspect of the embodiments of this application provides a computer-readable storage medium, where the computer-readable memory medium stores an instruction, when the instruction is run on a computer, the computer is enabled to perform the method described in the foregoing aspects. It should be noted that, the technical solutions of this application essentially, or the part contributing to the prior art, or all or some of the technical solutions may be implemented in the form of a software product, and the computer software product is stored in a storage medium that is configured to store the computer software instruction used by the foregoing device, where the instruction includes a program designed for the terminal to perform the foregoing first aspect.

The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

A fifth aspect of the embodiments of this application provides a computer program product that includes an instruction. When the instruction is run on a computer, the computer is enabled to perform the method described in the first aspect of this application or any optional implementation of the first aspect.

The technical solutions provided in the embodiments of this application have the following beneficial effects:

The terminal provided in the embodiments of this application includes a rule platform with system-level permission, and the rule platform manages rules required by a plurality of applications of the terminal together. Therefore, when the rules required by the plurality of applications include the same conditions, the rule platform only needs to obtain the event of the terminal and match the obtained event with the condition, thereby saving system resources and preventing the system resources from being invoked repeatedly. The system-level permission means that all resources of a system can be used.

BRIEF DESCRIPTION OF DRAWINGS

FIG. 3A-1 and FIG. 3A-2 are a schematic diagram of displaying a plurality of match conditions on a terminal according to an embodiment of this application:

FIG. 3B-1 and FIG. 3B-2 are a schematic diagram of displaying a plurality of recommendation results on a terminal according to an embodiment of this application;

FIG. 3C-1, FIG. 3C-2, and FIG. 3C-3 are a schematic diagram of selecting a target match condition and a target recommendation result by a user according to an embodiment of this application;

FIG. 3D-1, FIG. 3D-2, and FIG. 3D-3 are a schematic diagram of selecting a target match condition and a target recommendation result by a user according to an embodiment of this application:

DESCRIPTION OF EMBODIMENTS

Figure 1A:
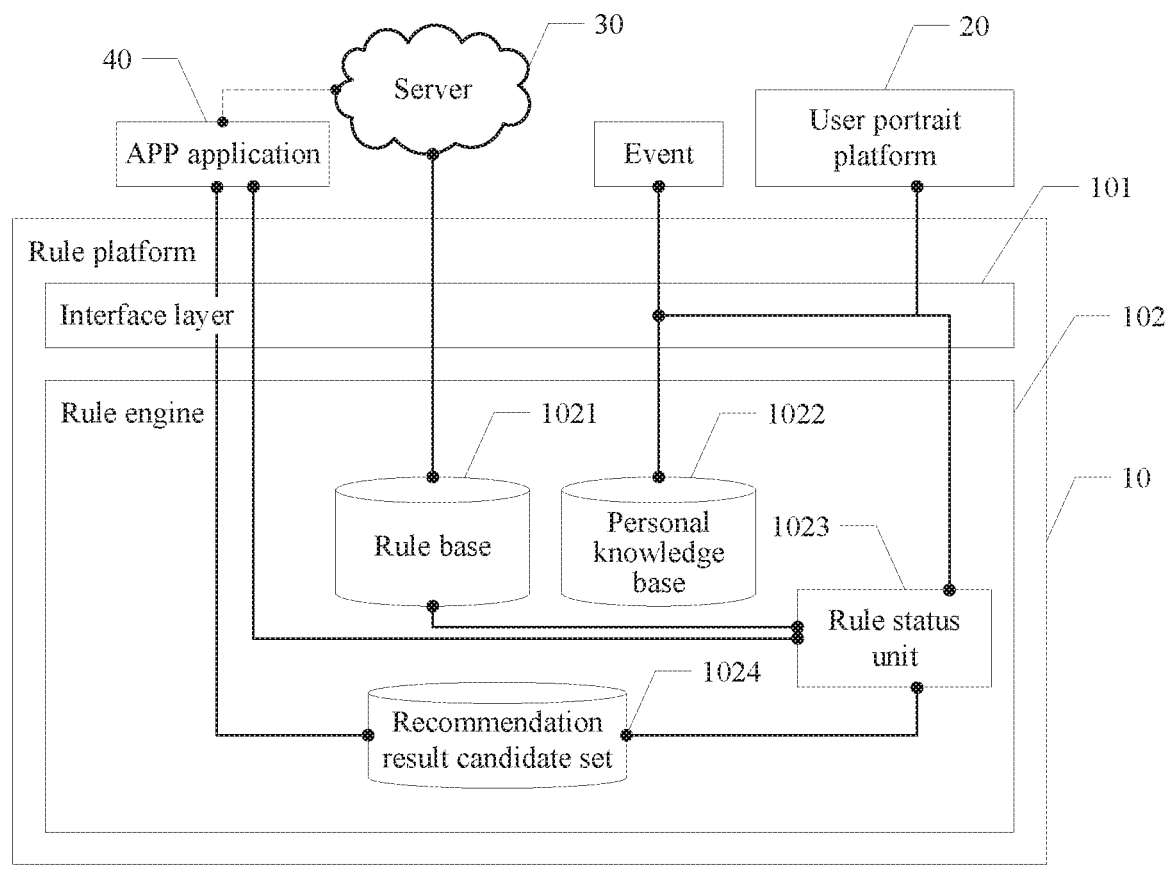
FIG. 1A is a system architecture diagram applied to an embodiment of this application.

With development of intelligent services, some intelligent reminders or services can be provided on a terminal based on historical behavior habits of a user or based on some rules or models, so that the user can use the terminal more conveniently, that is, making the user feel that the terminal is getting increasingly intelligent.

The terminal can implement various intelligent services by itself or by combining with a cloud. Specifically, the terminal may include a rule platform, an algorithm platform, and a user portrait platform. The terminal can implement, by using one or more of the three platforms and other resources, various intelligent services, for example: 1. service recommendation; 2. reminder service; and 3. notification filtering service.

1. Service recommendation. The terminal includes a service recommendation framework, and the service recommendation framework includes at least an algorithm platform, a rule platform, and a user portrait platform. The service recommendation platform can match, by using the rule platform, a service that a user of the terminal wants to use in a current scenario. The service recommendation platform can also predict, based on a model by using the algorithm platform, the service that the user of the terminal wants to use in the current scenario. The service recommendation platform may display a predicted service in an interface for displaying a recommended application, so that the user can easily access an interface corresponding to the service from the interface for displaying a recommended application. A rule may be sent by a server (that is, the cloud) to the terminal. The rule may be obtained through big data statistics, or may be summarized according to empirical data. The model is obtained by training historical data and feature data of the user through the algorithm platform. In addition, the model can be updated based on new user data and feature data. The historical data of the user may be behavior data of using the terminal by the user in a period of time. The feature data of the user may include a user portrait or other types of feature data, and the other types of feature data may be, for example, the current user behavior data. The user portrait may be obtained through the user portrait platform of the terminal.

2. Reminder service. The terminal includes a recommendation framework (framework). The recommendation framework includes a rule platform, a graphical user interface (Graphical User Interfaces. GUI), and a user portrait platform. The rule platform can monitor various events. An application in the terminal can register various rules with the rule platform. Then, the rule platform monitors various events in the terminal according to the registered rules; matches the detected events with the rules; and when a detected event can match all conditions of a rule, triggers a reminder corresponding to the rule, that is, recommends a highlight to the user. Finally, the reminder is displayed by a user interface or the application that registers the rule. Further, conditions of some rules may be restrictions in a user portrait. The rule platform may request a current user portrait from the user portrait platform to determine whether the current user portrait matches the conditions of the rules.

3. Notification filtering service. The terminal includes a notification filtering framework. The notification filtering framework includes a rule platform, an algorithm platform, and a user portrait platform. When obtaining a notification, the notification filtering framework may determine a type of the notification through the rule platform or through the algorithm platform. Then, the notification filtering framework determines, based on the type of the notification and a preference of a user, whether the notification is a notification of interest for the user, and displays reminders for notification of interest and notification of no interest in different manners. The preference of the user may include the user portrait, and may also include a historical processing behavior of the user for a specific type of notification. The user portrait is provided by the user portrait platform.

The following embodiments of this application mainly detail the foregoing second service, that is, the reminder service. The following descriptions of the rule platform, the user portrait platform, and the graphical user interface focus on functions related to the reminder service. The rule platform, the user portrait platform, and the graphical user interface included in the terminal are not limited to the functions described below.

A technical solution of this application provides a rule platform that is included in a terminal. The rule platform is a system-level service, and can obtain data of a system-level application and a non-system-level application on the terminal. The rule platform may provide a unified rule base and a unified personal knowledge base. The rule base implements unified rule matching and life cycle management functions, and implements simplified and easy-to-use rule matching and life cycle management solutions to reduce application development costs. The personal knowledge base provides a unified mobile phone status and user information management mechanism, supports proactive monitoring of system events and passive monitoring of application events, performs rule matching, makes rule matching more reasonable, and reduces system resource consumption. Rules can be updated through a server. After the rule matching is successful, an application is allowed to proactively obtain a recommendation result, and a rule engine is allowed to proactively activate a recommendation result. The recommendation result may be displayed by the terminal, in other words, the terminal reminds a user of the recommendation result, that is, the reminder service.

FIG. 1A is a system architecture diagram applied to an embodiment of this application. A rule platform 10 is included in a terminal, and is a system-level application. The rule platform 10 provides an ability to manage and match rules for a plurality of APPs in the terminal. A user portrait platform 20, an application 40, and a graphical user interface 50 are also included in the terminal.

Any one or more applications 40 in the terminal may register a rule with the rule platform 10, and the rule platform 10 stores the rule registered by the application. The rule platform 10 may be further connected to a cloud server 30, and can periodically query the cloud server 30 for whether any rule is updated, and if a rule is updated, the rule platform 10 downloads the updated rule to update the related rule. The rule platform 10 may be further connected to the user portrait platform 20 in the terminal. The rule platform 10 may obtain a user portrait from the user portrait platform 20 and store the obtained user portrait. In addition, the rule platform 10 may send a detected event to the user portrait platform 20, so that the user portrait platform 20 can update the user portrait.

Further, the rule platform 10 may include: an interface layer 101 and a rule engine 102.

1. Interface layer 101: an invocation or communication method agreed between modular programs. Due to function decoupling between modules, information that needs to be shared may be defined in an interface. Decoupling is to separate modules that are not correlated or limitedly correlated in a program.

In this application, the interface layer 101 has the following functions: monitoring an event; registering, modifying, querying, and deleting a rule; returning a recommendation result to the application 40; sending a detected event to the personal knowledge base 1022, the user portrait platform 20, and a rule status unit 1023; and the like. For example, the application 40 may register a rule to a rule base 1021 of the rule engine 102 through the interface layer 101.

2. Rule engine 102: A developer may use the engine to quickly build or deploy a function required by a program, or use the engine to help a program to run. Generally, an engine is a support part of a program or a system. Common program engines include a game engine, a search engine, an antivirus engine, and the like. The rule engine 102 in this application may include function modules such as the rule base 1021, the personal knowledge base 1022, the rule status unit 1023, and a recommendation result candidate set 1024.

(1) The rule base 1021 may include any one or more rules registered by the application 40, and a user-defined rule. Each rule in the rule base 1021 may include the following content:

a. Basic information: also known as rule general information, such as a rule name, a rule version, an applicable system version, a corresponding service name, a rule priority, delay times before rule-based recommendation is triggered, an increase type of rule matching delay times, rule silent days after registration, and an applicable mobile phone version.

b. Events: may include a system event and an application event. The system events include various system-level events, such as screen on/off, headphones inserted/removed, various sensor events, a power volume, and a network status. The rule platform 10 has system-level permission, in other words, the rule platform 10 can obtain all system events. It should be noted that, in specific implementation, an event in the rule base 1021 may be a minimum event resulting from decomposition. The minimum event may be understood as an event on which no further decomposition can be performed, and may be referred to as an atomic event. It is easy to match a minimum event with a condition in a rule. If an event is not a minimum event, there may be various combinations, and matching with a rule is complex and difficult. The application event is, for example, a specific state in which an application is. For example, starting an Alipay application can be an application event.

c. Match condition: describes a condition in a rule. To be specific, a rule needs to be matched with a specific condition to output a recommendation result. Herein, one rule is used as an example for description. Condition 1: in a Wi-Fi state; condition 2: 7:00 p.m. to 10:00 p.m.; condition 3: watching a same program for three consecutive days. A recommendation result corresponding to the rule is: automatically caching the program when the program is updated next time. Condition 1, condition 2, and condition 3 herein are match conditions.

d. Life cycle condition: A rule may have a life cycle. In other words, some rules have a life cycle, and some rules do not have a life cycle. For example, (1) when an event detected by the interface layer 101 matches with a rule in the rule base 1021, a life cycle condition corresponding to the rule is "remind once", and a result is "disabled". This means when the rule is matched, the rule is disabled after a recommendation result is output once. (2) When an event detected by the interface layer 101 matches a rule in the rule base 1021, life cycle conditions corresponding to the rule are as follows: Condition 1: A function has been recommended once, and a result is "sleep"; condition 2: A sleep period is seven days, and a result is "reactivating a function seven days later", that is, no recommendation result is output to a user in these seven days; and condition 3: A function has been recommended twice, and a result is "disabled". There may be several life cycle states, such as no, active, disabled, sleep, and reset.

e. Action after rule matching: describes a corresponding recommendation result obtained after an event detected by the interface layer 101 successfully matches with a rule. The APP application 40 is allowed to automatically obtain the recommendation result, and the rule platform 10 is allowed to proactively activate the recommendation result.

(2) The personal knowledge base 1022 has at least the following functions: storing an event detected by the interface layer 101, storing a user portrait obtained by analyzing this event by the user portrait platform 20, and storing a life cycle state, a condition matching status, and the like of a rule. Specifically, the personal knowledge base 1022 may receive an event sent by the interface layer 101, and record the event. Event recording may include: recording information such as a type, time, and a location of the event, updating an occurrence quantity of the event, and the like.

The rule platform 10 may request a user portrait from the user portrait platform 20, and then store the obtained user portrait in the personal knowledge base 1022. After detecting an event, the rule platform 10 may send the detected event to the user portrait platform 20, and the user portrait platform 20 may update the user portrait based on the newly received event, and send an updated user portrait to the rule platform 10.

The interface layer 101 may further send the event to the rule status unit 1023. The personal knowledge base 1022 may further record a condition matching status. After the rule status unit 1023 matches the obtained event with a condition of the related rule, if the matching is successful, a successful matching state is recorded in the personal knowledge base 1022, that is, the condition matching status is stored in the personal knowledge base 1022. In other words, a recommendation result is output only after a rule meets one or more conditions. For example, when one or more detected events are matched with one or more conditions of a rule, a status of the condition or conditions can be recorded as "matched". Then, other events are received to determine whether other conditions of the rule are matched. If all the conditions are matched, a state of the rule in the rule status unit 1023 is "matched", and a recommendation result can be output to the application 40.

The personal knowledge base 1022 may further record a period status of a rule related to the event, obtained from the rule status unit 1023. After a rule is matched, a period status of the rule may be recorded correspondingly. For example, a recommendation result is output once every five days after the rule is matched. In this case, after the rule is matched, the rule enters a sleep period, and enters an active state again five days later. It should be understood that, during the five days, even if a detected event matches the rule, no recommendation result is output because the rule is still in a sleep state.

(3) The rule status unit 1023 is configured to receive an event sent from the interface layer 101. The rule status unit 1023 may obtain a rule related to the event from the rule base 1021 to update a status. If states of all conditions of a rule in the personal knowledge base 1022 are "matched", the rule status unit 1023 records a state of this rule as "matched", and the rule status unit 1023 may output a recommendation result corresponding to the rule to any one or more applications 40.

(4) The recommendation result candidate set 1024 may store a corresponding recommendation result after a rule is matched, and the application 40 may obtain one or more recommendation results from the recommendation result candidate set 1024 for display.

Figure 1B:
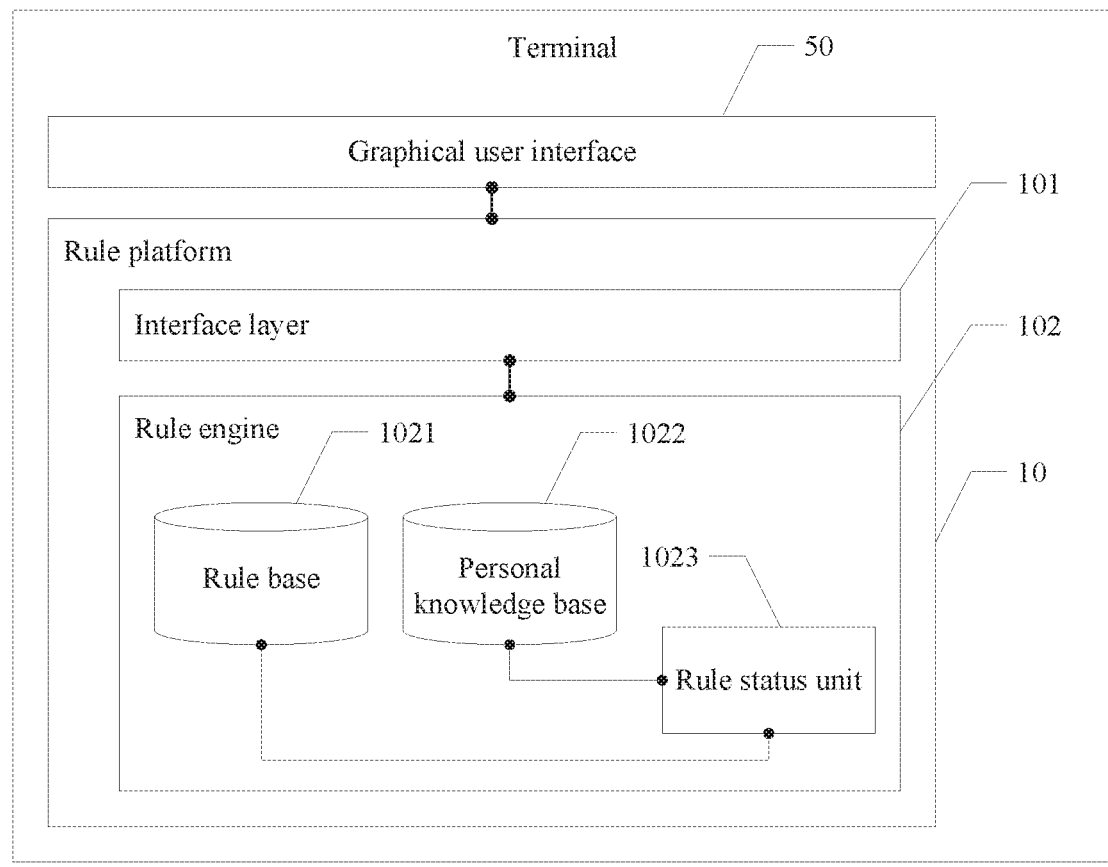
FIG. 1B is a schematic diagram of an embodiment of a terminal according to an embodiment of this application.

In an embodiment of this application, FIG. 1B is a schematic diagram of an embodiment of a terminal. The terminal includes a rule platform 10 and a graphical user interface 50. The rule platform 10 includes an interface layer 101 and a rule engine 102. The rule engine 102 includes a rule base 1021, a personal knowledge base 1022, and a rule status unit 1023.

The rule base 1021 includes at least one rule, and each rule includes at least one condition.

The interface layer 101 is configured to obtain a first event.

The rule status unit 1023 is configured to: obtain at least one rule related to the first event from the rule base 1021, update a matching status of a first condition corresponding to the first event in the at least one rule related to the first event, and record the matching status in the personal knowledge base 1022; and is further configured to: when a matching status of each condition in a first rule indicates that matching is successful, output a recommendation result corresponding to the first rule.

The personal knowledge base 1022 is configured to store the first event, and the matching status of the first condition in the at least one rule related to the first event.

The graphical user interface 50 is configured to display the recommendation result.

Optionally, in some embodiments of this application, the interface layer 101 is further configured to receive the first rule sent by a first application, and store the first rule in the rule base 1021.

Optionally, in some embodiments of this application, that the rule status unit 1023 outputs a recommendation result corresponding to the first rule includes: the rule status unit 1023 sends the recommendation result to a second application.

The graphical user interface 50 is specifically configured to display the recommendation result by the second application, where the second application is the same as or different from the first application.

Figure 1C:
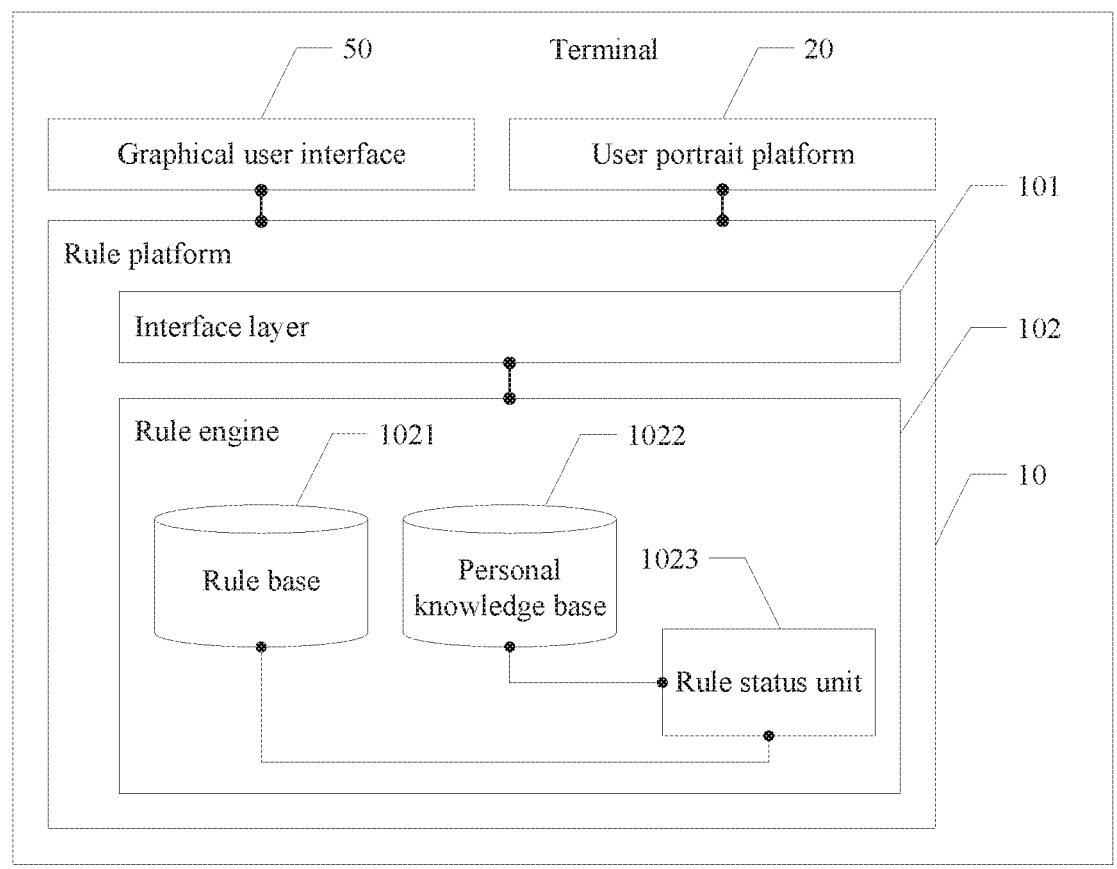
FIG. 1C is a schematic diagram of another embodiment of a terminal according to an embodiment of this application.

Optionally, in some embodiments of this application. FIG. 1C is a schematic diagram of another embodiment of a terminal. The rule engine 102 further includes a recommendation result candidate set 1024. That the rule status unit 1023 outputs a recommendation result corresponding to the first rule includes: the rule status unit 1023 outputs the recommendation result to the recommendation result candidate set 1024. The graphical user interface 50 is specifically configured to display the recommendation result obtained by the second application from the recommendation result candidate set 1024, where the second application is the same as or different from the first application.

Figure 1D:
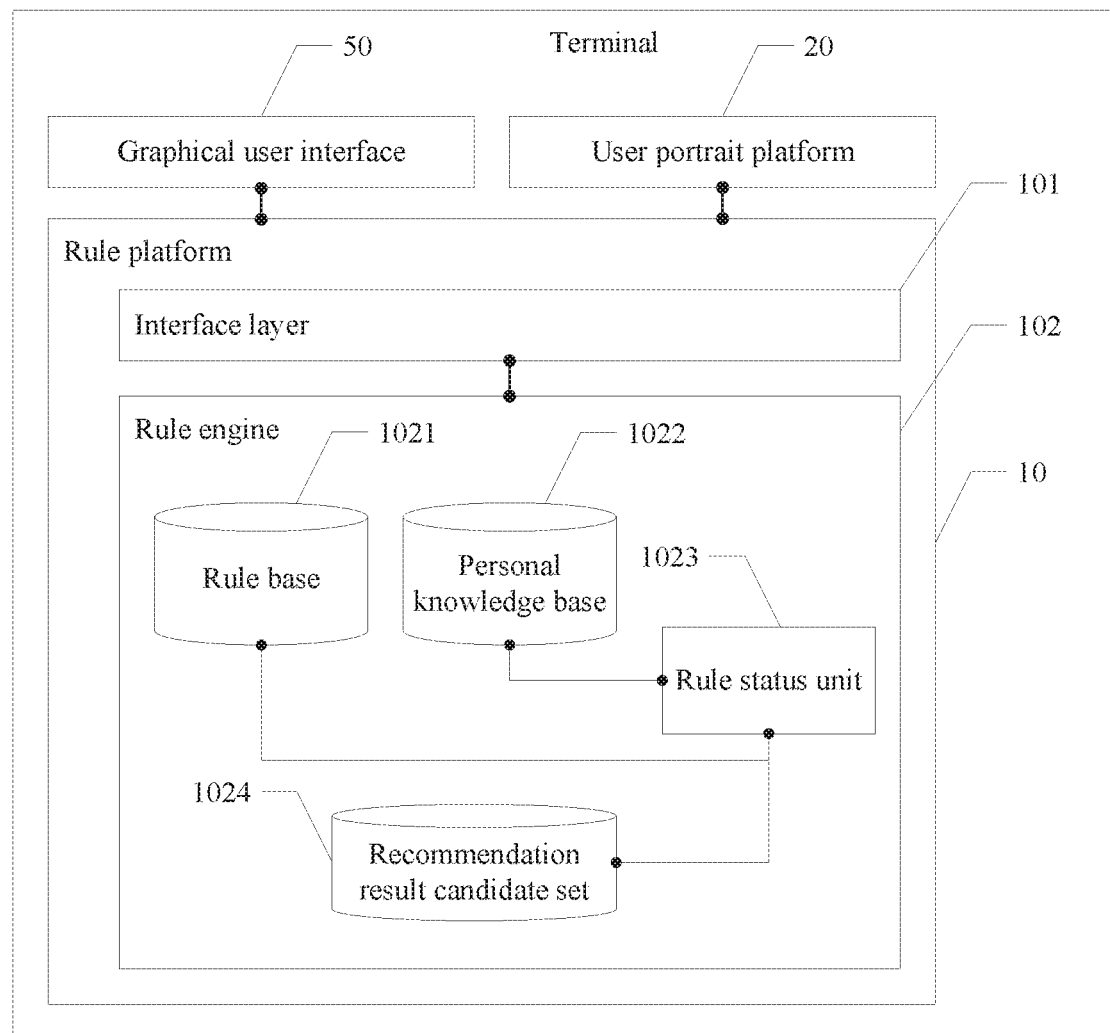
FIG. 1D is a schematic diagram of another embodiment of a terminal according to an embodiment of this application.

Optionally, in some embodiments of this application, FIG. 1D is a schematic diagram of another embodiment of a terminal. The terminal further includes a user portrait platform 20, and the first rule includes a second condition related to a user portrait 20. The personal knowledge base 1022 is further configured to obtain a current user portrait from the user portrait platform 20 of the terminal; and update a matching status of the second condition based on the current user portrait.

Optionally, in some embodiments of this application, the rule base 1021 is further configured to receive, through the interface layer 101, an updated rule sent by a server; and update a rule related to the updated rule in the rule base 1021.

In this application file, the rule platform 10, the user portrait platform 20, and the like may all be implemented on the terminal. The terminal may include: a mobile phone, a tablet computer (tablet personal computer), a laptop computer (laptop computer), a digital camera, a personal digital assistant (personal digital assistant, PDA for short), a navigation apparatus, a mobile internet device (mobile internet device, MID), a wearable device (wearable device), and the like.

Figure 2:
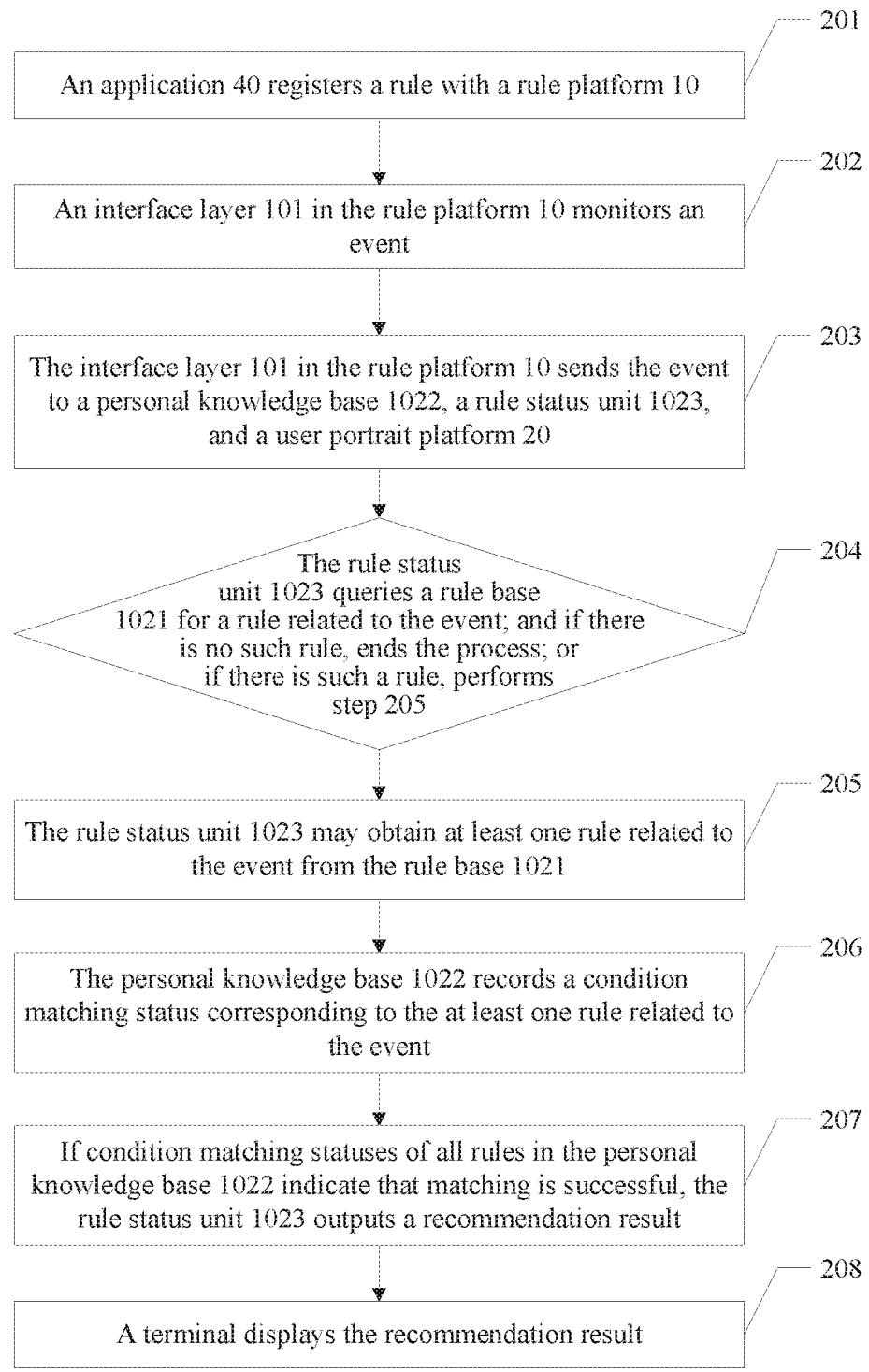
FIG. 2 is a schematic diagram of an embodiment of a recommendation method according to an embodiment of this application.

The following embodiments further describe the technical solutions in this application. FIG. 2 is a schematic diagram of an embodiment of a recommendation method according to an embodiment of this application. The recommendation method includes the following steps.

Step 201. An application 40 registers a rule with a rule platform 10.

Any one or more applications, or all applications on a terminal may register a rule with the rule platform 10, and a function engine 102 in the rule platform 10 may store the rule registered by the application to a rule base 1021 for centralized management. To be specific, the APPs may register respective rules with the rule engine 102 by using an Android interface definition language (Android Interface Definition Language, AIDL) interface provided by the rule engine 102, and the rule engine 102 stores the rules registered by the APPs to the rule base 1021. Each application may register one or more rules with the rule platform 10.

Rules included in the rule base 1021 may be classified into a rule defined in an application and a user-defined rule. The user-defined rule is also actually implemented on the application, and this application may be referred to as a custom application. To be specific, a plurality of match conditions and recommendation results may be defined in the custom application, where the plurality of match conditions and recommendation results may be displayed on a display interface of the terminal; and then a user may select a target match condition and a corresponding target recommendation result based on a requirement of the user, so as to generate a customized rule. It should be understood that, the rule base 1021 includes at least one rule, and each rule includes at least one condition.

Figures 1, 3A:
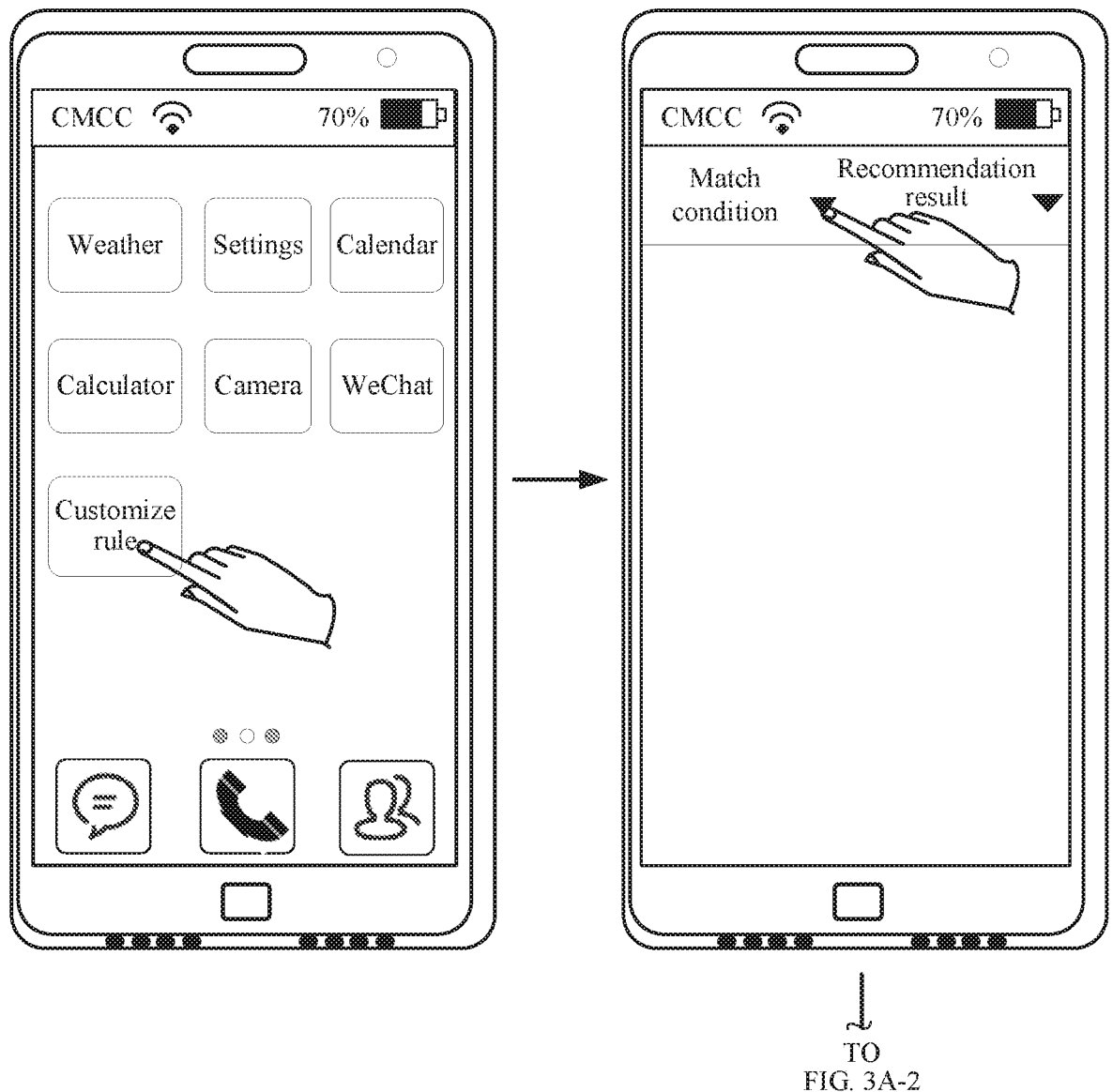
Figures 2, 3A:
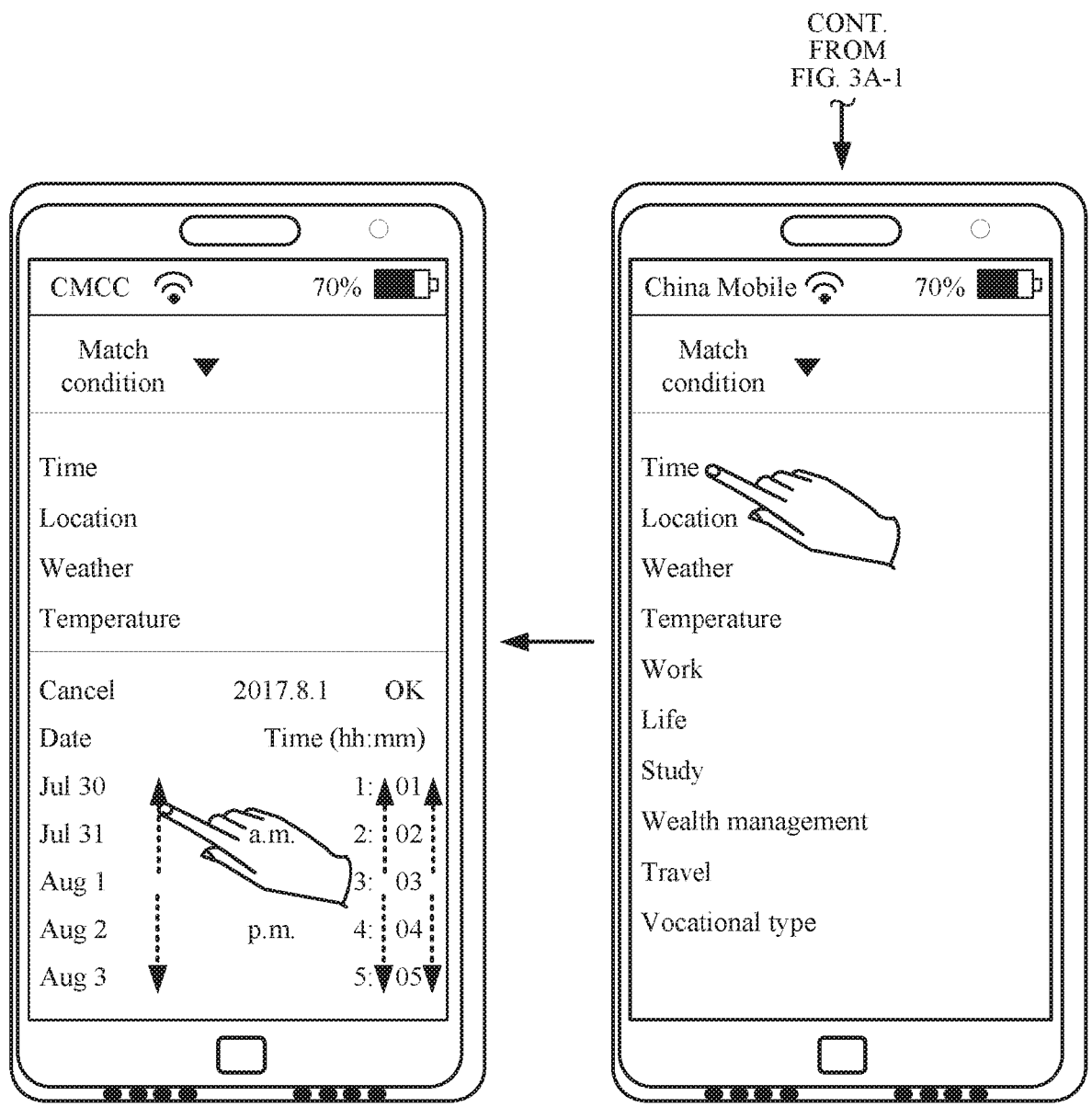
Figures 1, 3B:
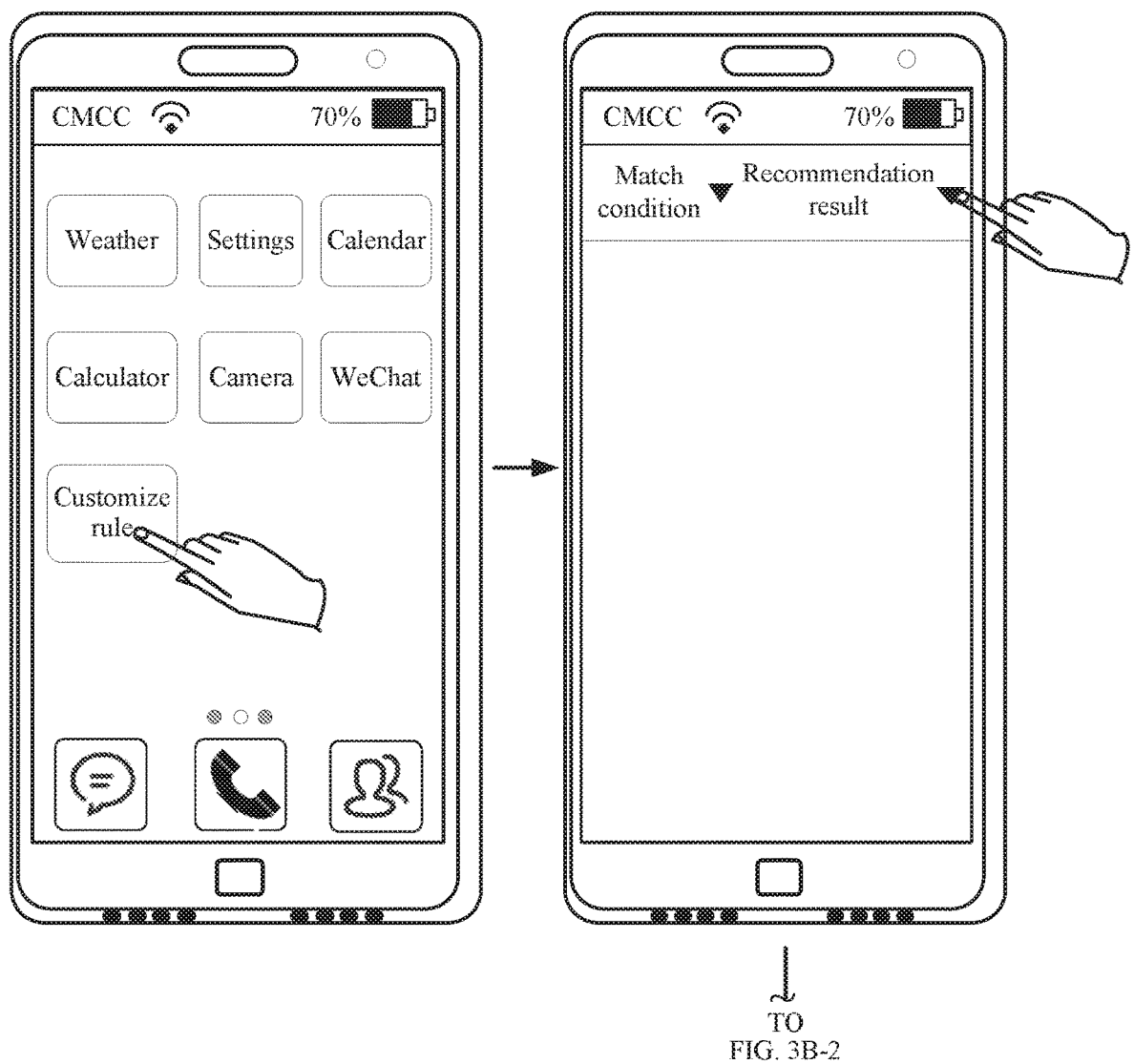
Figures 2, 3B:
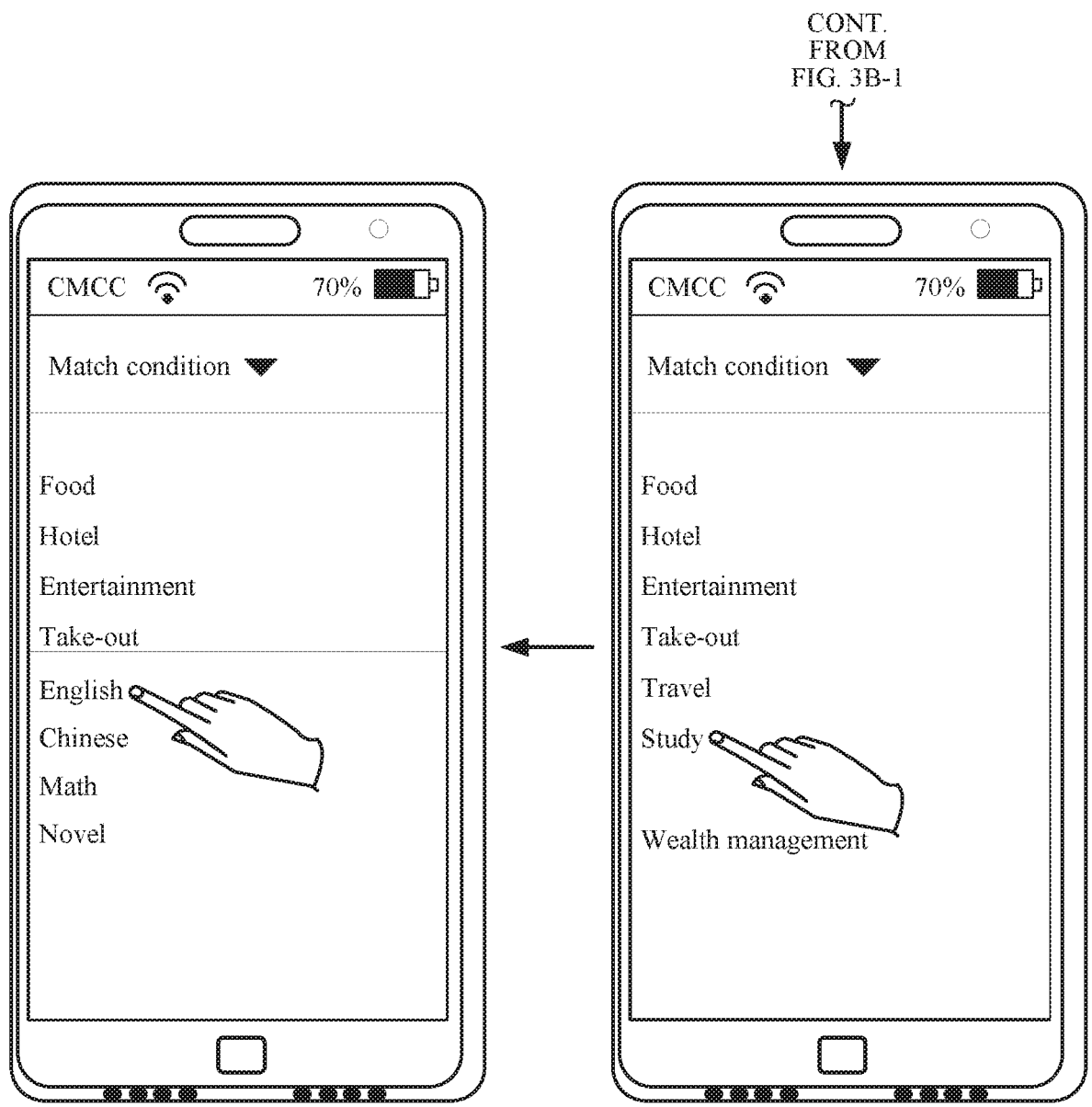
Figure 3D:
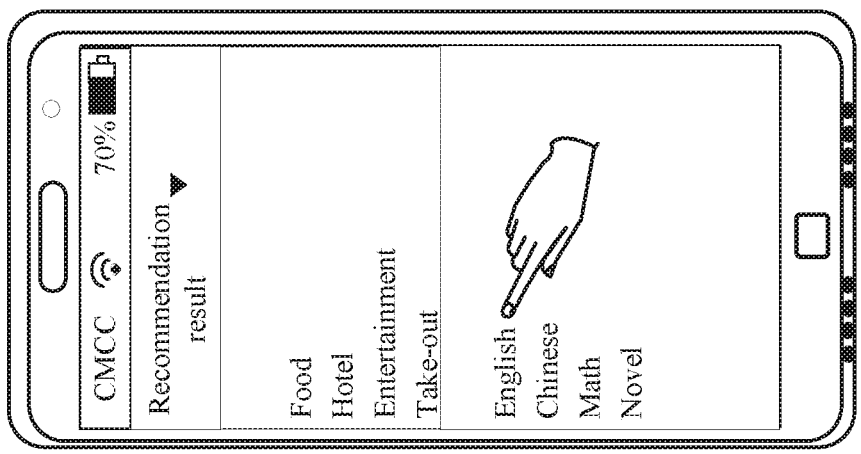
Figure 1:
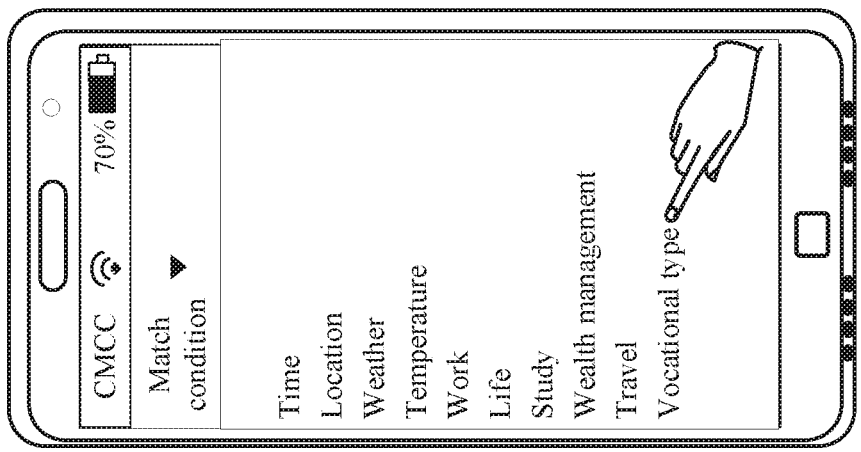

Further, the plurality of match conditions and recommendation results may be classified by type. For example, FIG. 3A-1 and FIG. 3A-2 are a schematic diagram of displaying a plurality of match conditions in a display interface on a terminal. Match condition types may include time, location, weather, temperature, work, life, study, and the like, and each match condition type may further include a plurality of match conditions. For example, FIG. 3B-1 and FIG. 3B-2 are a schematic diagram of displaying a plurality of recommendation results in a display interface on a terminal. Recommendation result types may include food, hotel, entertainment, take-out, travel, study, and the like, and each recommendation result type may further include a plurality of recommendation results. The plurality of match conditions and the plurality of recommendation results are available for the user to select, so as to generate a user-defined rule.

For example, FIG. 3C-1, FIG. 3C-2, and FIG. 3C-3 are a schematic diagram of selecting a target match condition and a target recommendation result by a user. When selecting a target match condition and a target recommendation result of a rule, the user may drag to display the target match condition and the target recommendation result on a display interface, and then tap an icon such as OK or Generate Rule to generate the user-defined rule.

Alternatively, FIG. 3D-1, FIG. 3D-2, and FIG. 3D-3 are a schematic diagram of selecting a target match condition and a target recommendation result by a user. The user selects a target match condition or a target recommendation result, and the target match condition/target recommendation result is added into a thumbnail icon. After the thumbnail icon is tapped, the target match condition and the target recommendation result of the rule are displayed. A display position of the thumbnail icon on the display interface is not limited, and the thumbnail icon may rotate, be added with a text prompt, be highlighted, or have its frame flashing, to remind the user.

It should be noted that, the rules stored in the rule base 1021 may be updated. The terminal may send a query request to a server 30, where the query request is used to query whether any rule is updated; the terminal receives an updated rule sent by the server 30; and the terminal updates a rule related to the updated rule in the rule base 1021.

Optionally, after any one or more applications 40 are upgraded, the upgraded application registers a rule with the rule platform 10, where the rule may include an updated rule; and updates all rules related to the updated rule in the rule base 1021. Alternatively, the application is not upgraded, but the application sends an updated rule to the server 30; the server 30 may store the updated rule; and the interface layer 101 in the rule platform 10 may periodically query the server 30 whether any rule is updated, and if a rule is updated, downloads the updated rule from the server 30, and updates all rules related to the updated rule in the rule base 1021.

It should be understood that, each application does not need to monitor an event; instead, the interface layer 101 of the rule platform 10 performs centralized management and monitoring. The rule platform 10 has system-level permission, can proactively monitor various system events, and can also passively monitor various application events. The application may set various rules. Even if the application does not have system-level permission, the application can write a system parameter as a match condition into a rule, so as to implement corresponding function recommendation. A rule may be any combination of different conditions.

The following uses examples to describe how an application registers rules and manages the rules together to save system resources. It is assumed that a first application registers a rule with the rule engine 102 through the interface layer 101, where match conditions of the rule are condition A, condition B, and condition C, and a corresponding recommendation result is performing a first operation; that a second application registers a rule with the rule engine 102 through the interface layer 101, where match conditions of the rule are condition A, condition B, and condition D. and a corresponding recommendation result is performing a second operation; and that a third application registers a rule with the rule engine 102 through the interface layer 101, where match conditions of the rule are condition B, condition C. and condition E, and a corresponding recommendation result is performing a third operation.

In the prior art, for example, for condition B, all the three applications need to monitor corresponding events. In this case, a system resource for condition B is repeatedly invoked, causing additional power consumption. In this embodiment of this application, if an event detected by the interface layer 101 matches condition B, the event may be recorded and invoked repeatedly. The event may match condition B in rules of the three applications. There is no need to monitor the event for three times, thereby saving system resources.

It should be understood that, obtaining, by the rule platform 10, an event may include: monitoring, by the interface layer 101 of the rule platform 10, the event; and sending, by the interface layer 101, the event to a personal knowledge base 1022, a rule status unit 1023, and a user portrait platform 20.

Step 202. The interface layer 101 of the rule platform 10 monitors an event.

In this embodiment of this application, each application does not need to monitor an event; instead, the interface layer 101 can monitor the event. The event may be any event occurring on the terminal; and the event may include a system event and/or an application event. A plurality of events may be detected by the interface layer 101 at the same time. The interface layer 101 may proactively monitor a system event, and the rule engine 102 needs to proactively register monitoring with a corresponding system module through the interface layer 101. The interface layer 101 may also passively monitor an event. For example, some application events are monitored passively by the interface layer 101. Specifically, the rule platform 10 may send a registration request to an application, so that the application sends some specific events to the interface layer 101 when the specific events occur. When these specific events occur on the application, the application proactively sends the specific events to the interface layer 101, that is, the interface layer 101 passively monitors the events.

Figure 4A:
FIG. 4A is a schematic diagram illustrating that an event monitored by a terminal is that the weather is thundershower according to an embodiment of this application.
Figure 4B:
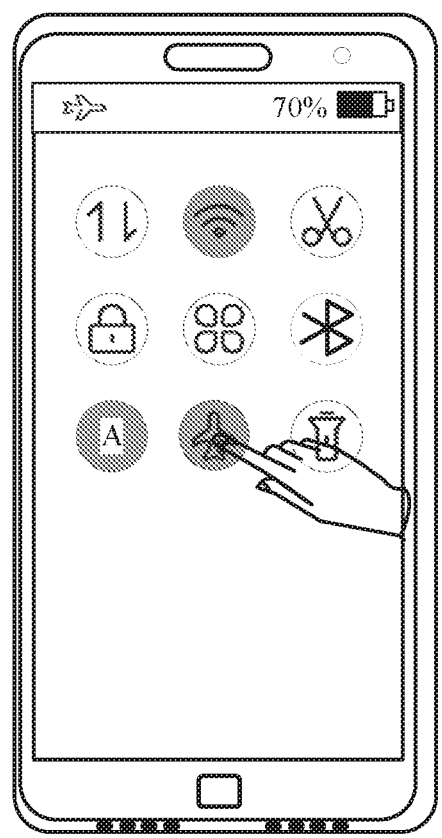
FIG. 4B is a schematic diagram illustrating that an event monitored by a terminal is enabling a flight mode according to an embodiment of this application.
Figure 4C:
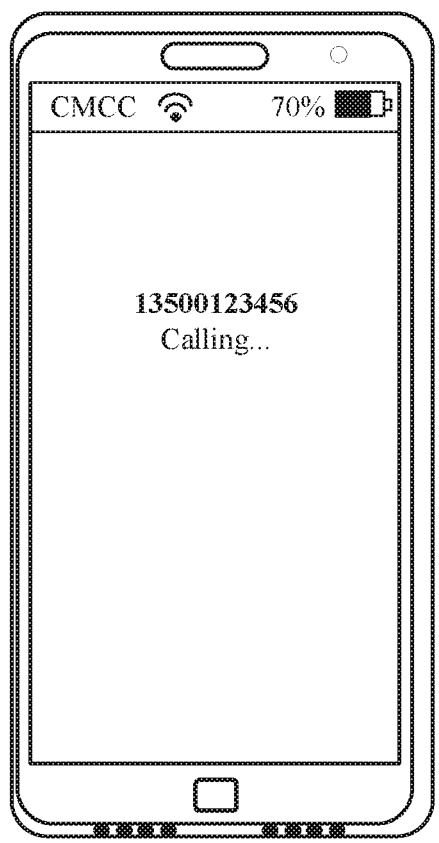
FIG. 4C is a schematic diagram illustrating that an event monitored by a terminal is making a call according to an embodiment of this application.
Figure 4D:
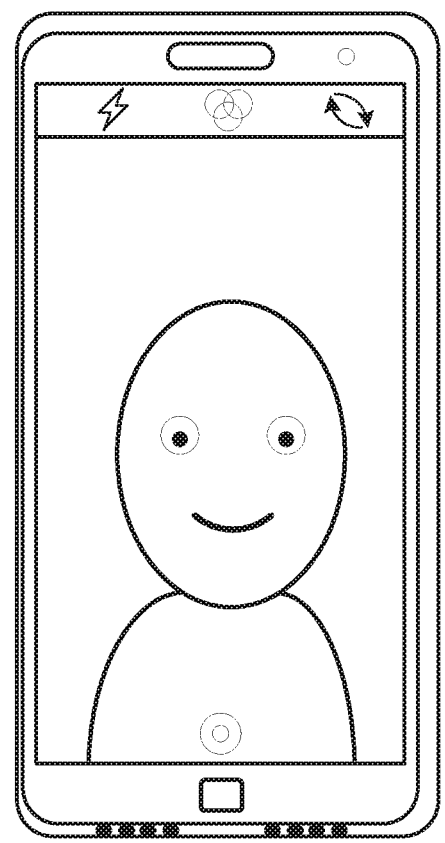
FIG. 4D is a schematic diagram illustrating that an event monitored by a terminal is that the terminal is in a photographing mode according to an embodiment of this application.

For example, the events may include inserting headphones, removing headphones, walking, running, cycling, driving/riding a car, power volume, screen on, black screen, weather, temperature, geographical fence, light intensity, a network status, wireless fidelity (wireless fidelity, Wi-Fi) on/off, mobile data on/off, vibration on/off, flight mode on/off, disturbance free on/off, eye protection mode on/off, date, time, camera on/off, and the like. As shown in FIG. 4A, an event that can be detected by the terminal is: the weather is thundershower. As shown in FIG. 4B, an event that can be detected by the terminal is: enabling a flight mode. As shown in FIG. 4C, an event that can be detected by the terminal is: making a call. As shown in FIG. 4D, an event that can be detected by the terminal is: being in a photographing mode.

Step 203. The interface layer 101 of the rule platform 10 sends the event to the personal knowledge base 1022, the rule status unit 1023, and the user portrait platform 20.

In this embodiment of this application, after the interface layer 101 monitors the event, the personal knowledge base 1022 receives the event sent by the interface layer 101, and the personal knowledge base 1022 may record and store the event, and specifically, may record information such as an occurrence quantity, time, a location of the event, and other information. The interface layer 101 may further send the event to the rule status unit 1023.

For example, a historical user portrait may be stored in the personal knowledge base 1022. The interface layer 101 may further send the event to the user portrait platform 20, and the user portrait platform 20 performs user tag analysis on the event to determine whether a user portrait changes. If the user portrait changes, an updated user portrait may be fed back to the personal knowledge base 1022. If the user portrait does not change, the original user portrait may be fed back or not fed back. After receiving the updated user portrait, the personal knowledge base 1022 may update the stored historical user portrait.

It should be understood that, the user portrait can be used as a condition to match with the match condition in the rule. Conditions in some rules include the user portrait, and conditions in some rules do not include the user portrait. The rules without the user portrait have no effect on rule matching. The rules with the user portrait are considered to be matched successfully only when one or more detected events and the user portrait all meet a match condition in a specific rule. Then a recommendation result can be output to the application 40. Alternatively, a recommendation result may be stored in a recommendation result candidate set 1024, and the application 40 proactively obtains the recommendation result from the recommendation result candidate set 1024.

Step 204. The rule status unit 1023 queries the rule base 1021 for a rule related to the event, and if there is no such rule, ends the process; or if there is such a rule, performs step 205.

It should be understood that if no rule related to the event is found in the rule base 1021, it indicates that the event is not written into a rule of the application, is useless, and can be discarded.

Step 205. The rule status unit 1023 may obtain at least one rule related to the event from the rule base 1021.

That the rule status unit 1023 of the rule platform 10 obtains at least one rule related to the event from the rule base 1021 may be obtaining all rules related to the event. The at least one rule related to this event may be registered by a plurality of applications, or may be registered by one application.

It should be understood that after receiving the event, the rule status unit 1023 may query and obtain at least one rule or all rules related to the event from the rule base 1021 to perform status update. The personal knowledge base 1022 may further record a condition matching status of the rule related to the event, and the condition matching status may be "matched", "satisfied", or other indication information. The personal knowledge base 1022 may store a condition of the rule related to the event, and record the condition matching status; or the personal knowledge base 1022 may record only the condition matching status (a condition identifier is unique); or another manner may be used. This is not specifically limited.

For example, a first event monitored by the interface layer 101 is 9:00 a.m., and two rules related to 9:00 a.m. are found in the rule base 1021 through query. In this case, the rule status unit 1023 may obtain the two rules for status update. Further, condition matching statuses corresponding to the two rules are recorded in the personal knowledge base 1022; or match conditions of the two rules may be stored in the personal knowledge base 1022, and condition matching statuses are recorded correspondingly. It is assumed that a first rule A is "6:00 a.m. to 10:00 a.m. in workdays (Monday to Friday)+poor air quality (an air pollution index is greater than 100), a recommendation result is 'wear a mask'"; and that a second rule B is "commuting hours (8:00 a.m. to 9:00 a.m., or 5:30 p.m. to 7:00 p.m.+headphones inserted+in-vehicle state, a recommendation result is 'play music using music software'".

Match conditions of the first rule A are: condition 1=workday (Monday to Friday), condition 2=in the morning (6:00 a.m. to 10:00 a.m.), and condition 3=air pollution index greater than 100.

Match conditions of the second rule B are: condition 1=commuting hours (8:00 a.m.-9:00 a.m., or 5:30 p.m.-7:00 p.m.), condition 2=headphones inserted, and condition 3=in-vehicle state.

Step 206. The personal knowledge base 1022 records a condition matching status corresponding to the at least one rule related to the event.

Following step 205, the personal knowledge base 1022 may obtain the match condition corresponding to the at least one rule or all rules related to the event from the rule status unit 1023, and the condition matching status may be recorded in the personal knowledge base 1022.

For example, a condition matching status for the first rule A may be: condition 1=workday (Monday to Friday), and a state is "none"; condition 2=6:00 a.m. to 10:00 a.m., and a state is "matched/satisfied"; and condition 3=air pollution index greater than 100, and a state is "none".

A condition matching status for the second rule B may be: condition 1=commuting hours (8:00 a.m.-9:00 a.m., or 5:30 p.m.-7:00 p.m.), a state is "matched/satisfied"; condition 2=headphones inserted, and a state is "none"; and condition 3=in-vehicle state, and a state is "none".

Alternatively, each rule has a unique identifier, and correspondingly, the rule identifier and the condition matching status may be directly recorded. For example, the status of condition 1 of the rule A is "matched/satisfied". It should be understood that the condition matching status of the rule may be recorded in various ways, which is not specifically limited.

For example, when a second event detected by the interface layer 101 is Tuesday, the interface layer 101 sends the event Tuesday to the rule status unit 1023, and the rule status unit 1023 queries the rule base 1021 for all rules related to the event Tuesday. For example, all the rules related to Tuesday are as follows: A first rule A is "6:00 a.m.-10:00 a.m. workday (Monday to Friday)+poor air quality (an air pollution index is greater than 100), a recommendation result is 'wear a mask'"; and a second rule C is "the third week of each month+Tuesday, a recommendation result is '50% off in McDonald's'".

Then, the personal knowledge base 1022 records the condition matching status for Tuesday. For the first rule A, condition 1=workday (Monday to Friday), a state is "matched/satisfied"; condition 2=6:00 a.m. to 10:00 a.m., a state is "matched/satisfied"; and condition 3=air pollution index greater than 100, a state is "none". For the second rule C, condition 1=January to December, a state is "none"; condition 2=the third week of each month, a state is "none"; and condition 3=Tuesday, a state is "matched/satisfied".

For example, when a third event detected by the interface layer 101 is a pollution index of 150, the interface layer 101 sends the event of a pollution index of 150 to the rule status unit 1023, and the rule status unit 1023 queries the rule base 1021 for all rules related to the event of a pollution index of 150. For example, all the rules related to the pollution index of 150 are: the first rule A "6:00 a.m. to 10:00 a.m. in workday (Monday to Friday)+poor air quality (an air pollution index is greater than 100), a recommendation result is 'wear a mask'".

Then, the personal knowledge base 1022 records a condition matching status of the pollution index of 150. For the rule A, "condition 1=workday (Monday to Friday), a state is 'matched/satisfied'; condition 2=6:00 a.m. to 10:00) a.m., a state is 'matched/satisfied'; and condition 3=air pollution index greater than 100, a state is 'matched/satisfied'".

Step 207. If condition matching statuses of all rules in the personal knowledge base 1022 indicate that matching is successful, the rule status unit 1023 outputs a recommendation result.

Following step 206, when a matching status of each condition in the first rule indicates that matching is successful, the terminal displays the recommendation result corresponding to the first rule. Optionally, the first rule may further include a second condition related to a user portrait; and the rule platform 10 obtains a current user portrait from the user portrait platform 20 of the terminal, and updates a match status of the second condition based on the current user portrait.

Optionally, when matching statuses of all conditions in the first rule and a second rule indicate that the matching is successful, and a priority of the first rule is higher than that of the second rule, the terminal displays a recommendation result corresponding to the first rule, where the second rule is one of the at least one rule related to the first event.

It should be understood that if there are at least two rules with a same priority, the terminal may randomly display a recommendation result corresponding to one of the at least two rules. If priorities are different, the terminal may display a recommendation result corresponding to a rule with a highest priority, or may display recommendation results corresponding to the first N (N is an integer greater than or equal to 2) rules with a highest priority.

For example, when the condition matching status of one or more rules related to the event is "matched/satisfied" or other information indicating that the matching is successful, the event is considered to be matched with the one or more rules, and the rule status unit 1023 outputs the recommendation result corresponding to the one or more rules. The rule status unit 1023 may proactively activate the recommendation result, and display the recommendation result on the application 40 through the interface layer 101. Alternatively, the recommendation result may be stored in the recommendation result candidate set 1024, the application 40 obtains the one or more recommendation results from the recommendation result candidate set 1024 through the interface layer 101, and the application 40 may display the recommendation result based on a priority of the rule.

It should be understood that each time the rule status unit 1023 proactively activates a recommendation result, the activated recommendation result is displayed on the application 40. When obtaining the recommendation result from the recommendation result candidate set 1024, the application 40 may obtain one or all recommendation results. After obtaining the recommendation result, the application 40 may control how to display the recommendation result. For example, the application 40 obtains a plurality of recommendation results. However, if the plurality of recommendation results are displayed at a time, interference may be caused to the user, and a crash may occur. In addition, the recommendation results may not be displayed on a same application. Optionally, the application 40 may set the rule priority. When a plurality of recommendation results are obtained, a recommendation result to be displayed on the application 40 may be determined based on recommendation results corresponding to the rule priorities, or another display manner may be used, which is not specifically limited.

For example, if the condition matching status of the first rule is: condition 1=workday (Monday to Friday), a state is "matched"; condition 2=6:00 a.m. to 10:00 a.m., a state is "matched"; and condition 3=air pollution index greater than 100, a state is "matched", the detected event is considered to be matched with the rule, and the rule status unit 1023 outputs the recommendation result.

If the condition matching status of the second rule is: condition 1=commuting hours (8:00 a.m.-9:00 a.m., or 5:30 p.m.-7:00 p.m.), a state is "satisfied"; condition 2=headphones inserted, a state is "satisfied"; condition 3=in-vehicle state, a state is "satisfied", the detected event is considered to be matched with the rule, and the rule status unit 1023 outputs the recommendation result.

For example, the server may collect usage habits of a plurality of users, and update rules based on the usage habits of the plurality of users. For example, there are two rules, and the server sends a first rule to 50 mobile phones: during commuting time (8:00 a.m.-9:00 am), prompting to listen to music, and sends a second rule to the other 50 mobile phones: during commuting time (8:00 a.m.-9:00 a.m.), prompting to view hot news. Then, the server may count a click rate of the 100 mobile phone users during the time period of 8:00 a.m.-9:00 a.m. If a click rate of listening to music is much higher than that of viewing hot news, the server may update the second rule to the first rule, or vice versa.

Step 208. The terminal displays the recommendation result.

In this embodiment of this application, that the terminal displays the recommendation result corresponding to the first rule may include: (1) sending, by the rule platform 10, the recommendation result to the second application; and displaying, by the second application, the recommendation result, where the second application is the same as or different from the first application; or (2) storing, by the rule platform 10, the recommendation result; and obtaining, by the second application, the recommendation result from the rule platform 10, and displaying the recommendation result, where the second application is the same as or different from the first application.

In other words, the application of the terminal receives and displays the recommendation result activated by the rule status unit 1023, or the application of the terminal obtains one or more recommendation results from the recommendation result candidate set 1024, and controls to display the one or more recommendation results. It should be noted that, the application of the event and the application that finally displays the recommendation result are not necessarily a same application.

Figure 5A:
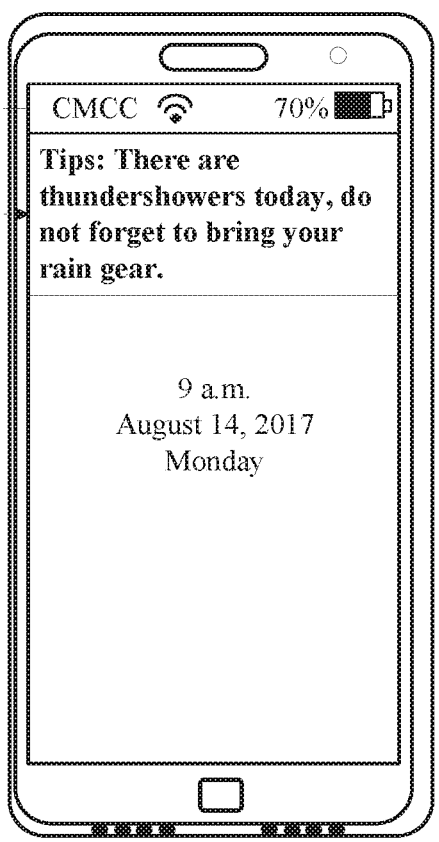
FIG. 5A is a schematic diagram of a recommendation result displayed by a terminal according to an embodiment of this application.
Figure 5B:
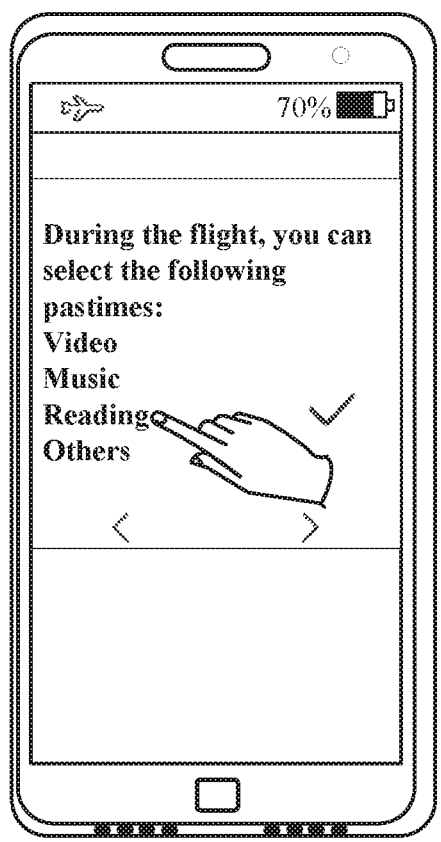
FIG. 5B is a schematic diagram of a recommendation result displayed by a terminal according to an embodiment of this application.

For example, if the detected event is "the weather is thundershower", and the user-defined rule specifies that the match condition is "thundershower" and the recommendation result is "There are thundershowers today, do not forget to bring your rain gear", when the rule matching is successful, the terminal displays the recommendation result, as shown in FIG. 5A. If the event detected is "enabling a flight mode", and a rule in the rule base 1021 specifies that the match condition is "flight mode enabled" and the recommendation result is "during the flight, you can select the following pastimes: video, music, reading, and others", when the rule matching is successful, the terminal displays the recommendation result, as shown in FIG. 5B.

Figure 5C:
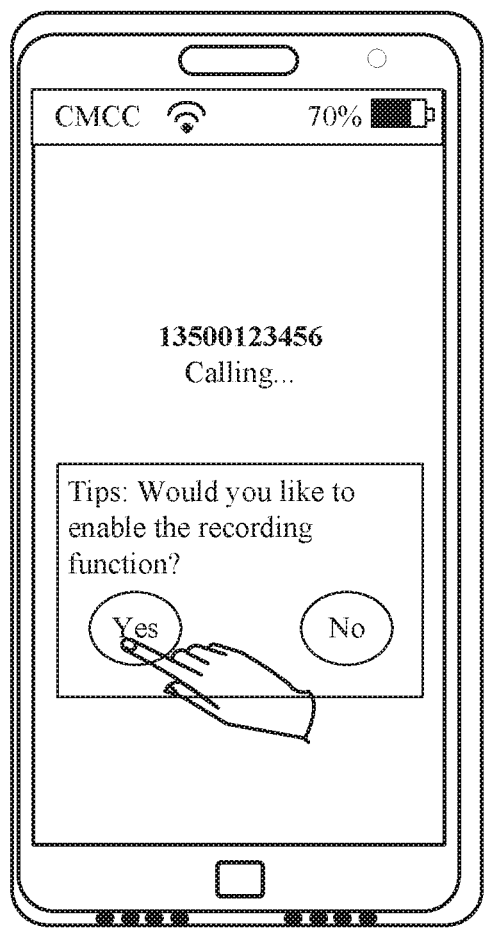
FIG. 5C is a schematic diagram of a recommendation result displayed by a terminal according to an embodiment of this application.
Figure 5D:
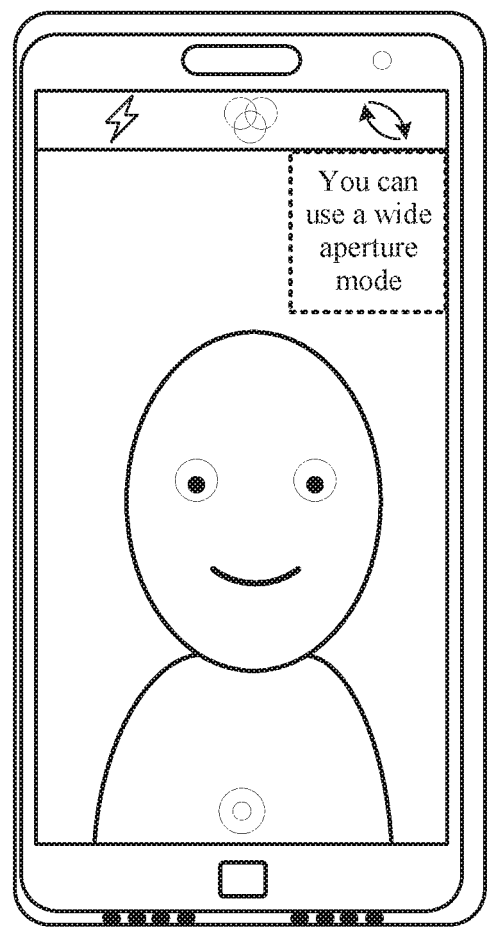
FIG. 5D is a schematic diagram of a recommendation result displayed by a terminal according to an embodiment of this application.

If the detected event is "making a call", and a rule in the rule base 1021 specifies that the match condition is "voice call" and the recommendation result is "Enable the recording function/allowed to use the recording permission?", when the rule matching is successful, the terminal displays the recommendation result, as shown in FIG. 5C. If the detected event is "camera on", and a rule in the rule base 1021 specifies that the match condition is "photographing mode" and the recommendation result is "You can use a wide aperture mode", the terminal displays the recommendation result, as shown in FIG. 5D.

Figure 5E:
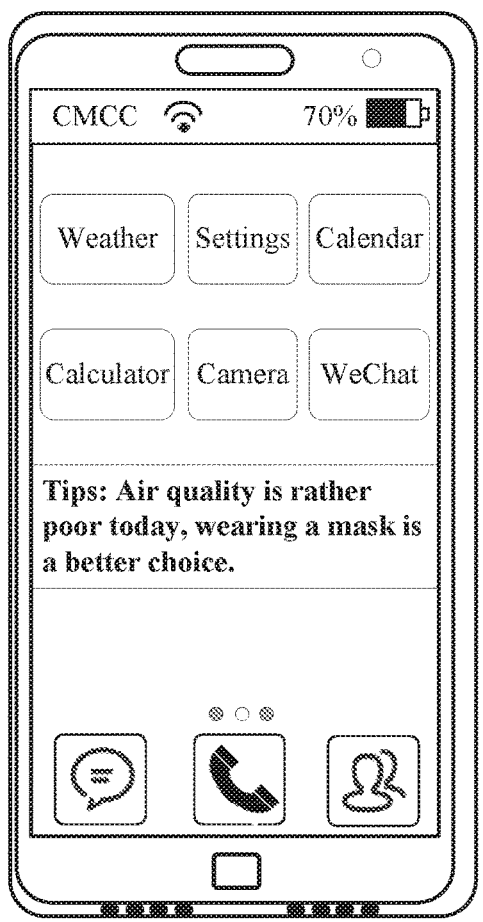
FIG. 5E is a schematic diagram of a recommendation result displayed by a terminal according to an embodiment of this application.
Figure 5F:
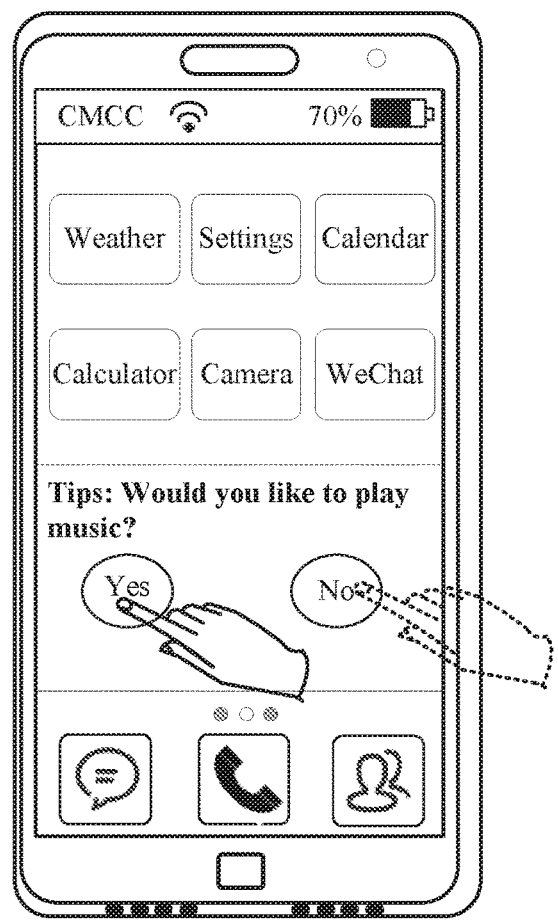
FIG. 5F is a schematic diagram of a recommendation result displayed by a terminal according to an embodiment of this application.

For example, if the first rule is successfully matched, the terminal displays "wear a mask". FIG. 5E is a schematic diagram of the recommendation result displayed on the terminal. If the second rule is successfully matched, the terminal displays "play music using music software". FIG. 5F is a schematic diagram of the recommendation result displayed on the terminal. If both the first rule and the second rule are successfully matched, a display order of the recommendation results may be determined based on priorities of the rules.

Figure 4E:
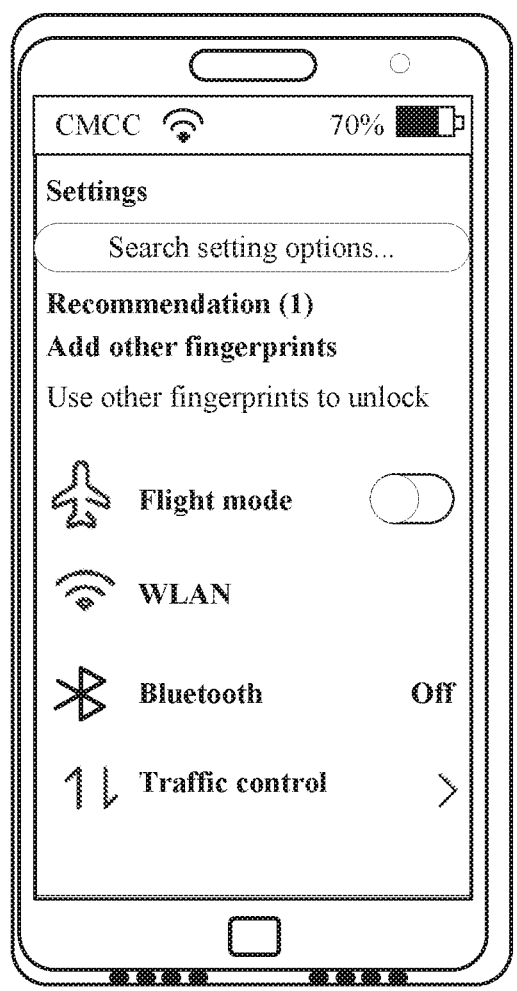
FIG. 4E is a schematic diagram of a recommended setting displayed by a terminal according to an embodiment of this application.
Figure 5G:
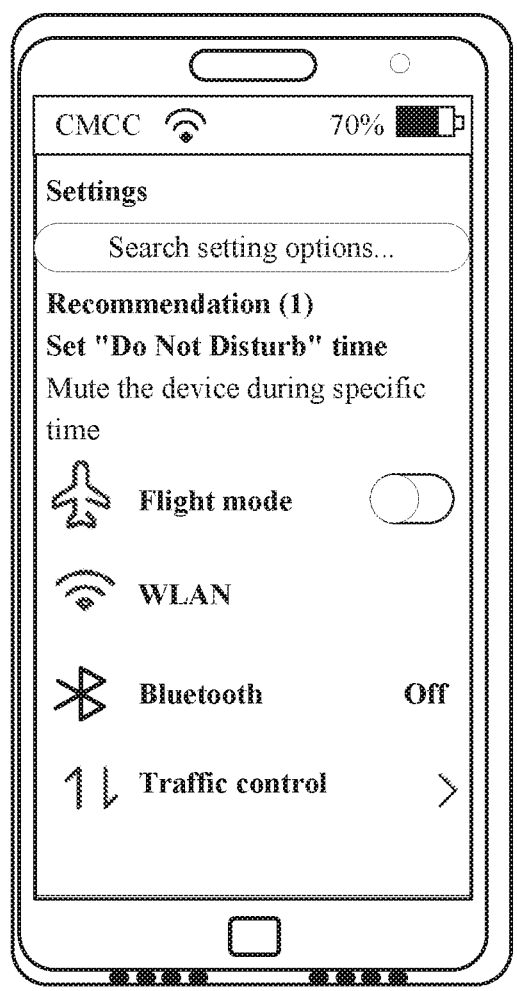
FIG. 5G is a schematic diagram of an updated recommended setting displayed by a terminal according to an embodiment of this application.

The first application or the second application described in the embodiments of this application may be, for example, a setting application. FIG. 4E is a schematic diagram of a display interface of a setting application. After the setting application is started, the display interface may display suggested setting options, such as adding other fingerprints (using other fingerprints to unlock). The setting application may send some rules to the rule base of the rule platform 10 in advance. For example, one of the rules is: rejecting three incoming calls during 11:00 p.m. to 6 a.m., and a recommendation result is: Set "do not disturb" time (mute the device during a specific time). When the event detected by the interface layer 101 is that incoming calls at 12 p.m., 2 a.m., and 4 a.m. are rejected, the rule is successfully matched, and the rule platform 10 returns the recommendation result to the setting application. As shown in FIG. 5G, an updated recommendation result is displayed on the display interface of the setting application, that is, "Set 'do not disturb' time (mute the device during a specific time)". The setting suggestion may be updated along with the recommendation results for rule matching.

The terminal provided in the embodiments of this application includes a rule platform with system-level permission, and the rule platform manages rules required by a plurality of applications of the terminal together. Therefore, when the rules required by the plurality of applications include the same conditions, the rule platform only needs to obtain the event of the terminal and match the obtained event with the condition, thereby saving system resources and preventing the system resources from being invoked repeatedly. The system-level permission means that all resources of a system can be used. Moreover, the terminal provides a unified rule management system, which may be a rule base and may implement unified rule matching and life cycle management functions. The terminal provides a unified context awareness system, which may be a personal knowledge base and may support user-defined rules. The rules stored in the rule base can be registered and updated through a cloud, and hot update of the rules is supported. The interface layer can proactively monitor a system event and passively monitor an application event, to trigger rule matching. The application can proactively obtain the recommendation result, and the engine can proactively activate the recommendation result. Unified rule management on the cloud, a rule definition template, a modular rule match condition, and a life cycle condition are supported. A rule status may be updated by updating a rule condition.

For example, the rule base may further include the following rules:

The rule base 1021 may include the following stored rules:

For example, (1) eye protection mode function prompt. If light intensity is greater than a first threshold, or the light intensity is less than a second threshold, or, between 9 p.m. and 6 a.m., or, a screen is on in a non-full screen mode for more than 10 minutes, the user may be prompted to use the eye protection mode. A life cycle includes three reminders, and an interval between reminders is five days.

(2) Long screenshot (scrolling screenshot) function prompt. If a user captures a screenshot first, then flicks up, down, left or right, and then captures a screenshot again, the user may be prompted to use the long screenshot function. A life cycle includes three reminders, and an interval between reminders is three days. In other words, the rule is disabled or reset after three prompts.

(3) Knuckle screenshot function prompt. After it is detected that a user uses a manner other than knuckle screenshot to capture a screenshot for two times (which can be self-defined), if a third non-knuckle screenshot is detected, the user may be asked whether to use the knuckle screenshot function, or the user may be prompted to use a knuckle prompt function. A life cycle may include two reminders, and an interval between the two reminders is seven days.

(4) Call recording function prompt. For example, in modes such as calling, voice chat, and video, a user may be prompted to enable a call recording function. A life cycle includes one reminder, that is, the rule is disabled or reset after one reminder.

(5) Camera wide aperture mode prompt. For example, if a camera provided in a system or a camera application provided by a third party (such as BeautyCam and Pitu) is used, in a photographing mode, a user may be prompted to use a wide aperture mode. A life cycle includes three reminders, and an interval between reminders is 15 days.

(6) Notification management function prompt. If a user performs an operation such as tapping or double-tapping on a notification message on a display screen, the user may be prompted to manage received notification messages. A life cycle includes two reminders, and an interval between reminders is two days.

(7) Timed power-on/off function prompt. For example, a user is prompted to power off a mobile phone at 11 p.m. and power on the phone at 7 a.m. A life cycle includes three reminders, and an interval between reminders is one day.

(8) Notification split-screen display function prompt. For example, if an SMS message, a WeChat message, or a QQ message is received in a full screen mode, a user may be prompted to use the split-screen display function. A life cycle includes three reminders, and an interval between reminders is three days.

(9) Add contact prompt of a scan business card function. For example, in an interface for adding a new contact, a user may be prompted to add information by using the scan business card function. A life cycle includes three reminders, and an interval between reminders is five days.

(10) Carry umbrella prompt. If the weather forecast shows that there is rain, snow, or ice storm on the day, a user may be prompted to bring rain gear.

(11) Video/music/reading prompt. When in an airplane, a flight mode is enabled, and there is no signal. However, it is quite boring during the flight, and a user may be asked whether to watch a video, listen to music, or read a book.

It may also be that the user selects the match condition and the corresponding recommendation result to generate a customized rule, for example: workday (Monday to Friday) morning (6:00 a.m. to 10:00 a.m.)+poor air quality (an air pollution index is greater than 10×)), prompting "wear a mask"; or, on the first day of each month, prompting "make credit card repayment, pay gas, electricity, and water bills, and top up the mobile phone"; or, every Friday afternoon (17:00-19:00)+rain/snow, prompting "Fresh Hema"; or, in-vehicle Bluetooth connected, automatically enabling "Gao De Navigation"; or other events. It should be noted that options in the user-defined rules may be preset in the mobile phone, and the user may select a desired option based on an actual requirement.

The rules may also be rules for recommending an APP (a third-party APP may be allowed) for a specified scenario. For example: commuting hours (8:00 a.m.-9:00 a.m., or 5:30 p.m.-7:00 p.m.)+headphones inserted+in-vehicle state, music software can be recommended; overtime period (7:00 p.m.-9:00 p.m.)+walk+company+rain/snow, a taxi hailing software can be recommended; and weekend (Saturday and Sunday)+not at home or work+dinner time (6:00 p.m.-9:00 p.m.)+static+movie fan, movie ticketing software can be recommended.

The rules may also be rules for targetedly recommending some functions of an APP (a third-party APP may be allowed). For example: using Alipay+stock software, Alipay's Ant Financial can be recommended; in-vehicle state+navigation+manual input, voice assistant can be recommended; too many pictures/documents, cloud backup can be recommended.

Figure 6:
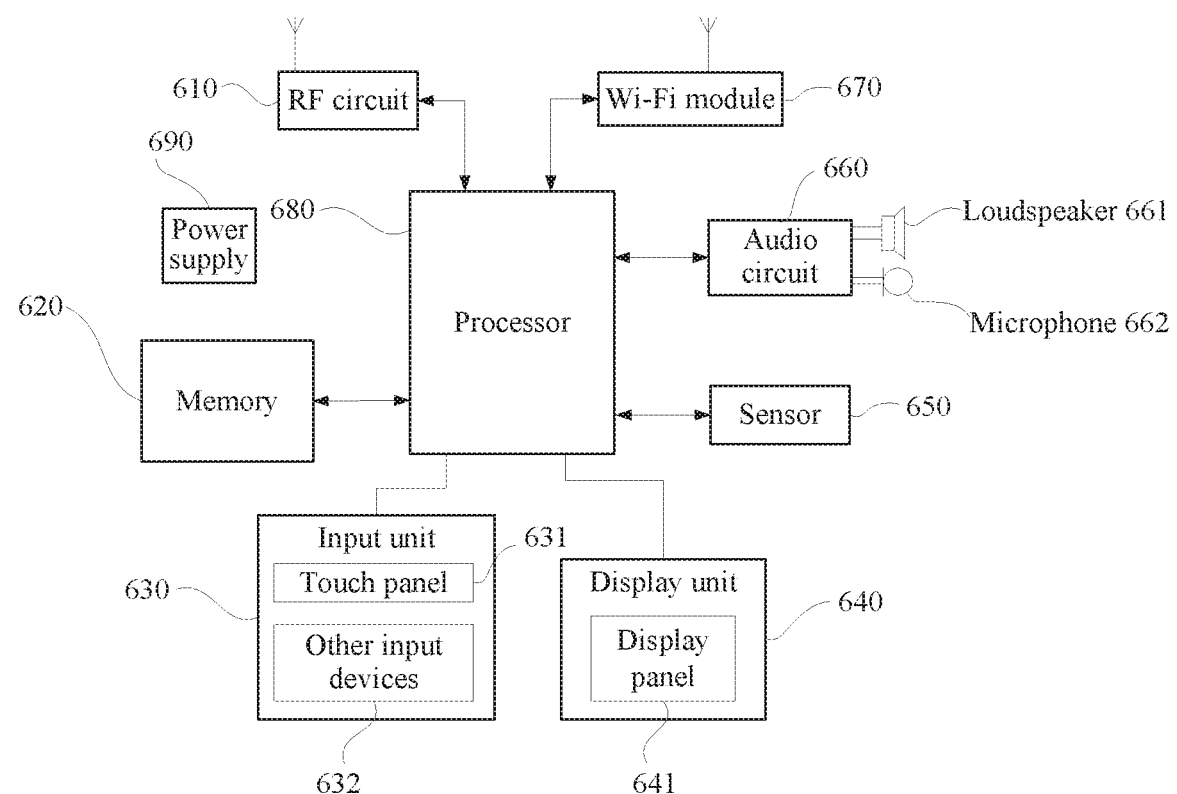
FIG. 6 is a schematic diagram of another embodiment of a terminal according to an embodiment of this application.

FIG. 6 is a block diagram of a partial structure of a mobile phone related to a terminal according to an embodiment of this application. As shown in FIG. 6, the mobile phone includes components such as a radio frequency (Radio Frequency, RF) circuit 610, a memory 620, an input unit 630, a display unit 640, a sensor 650, an audio circuit 660, a wireless fidelity (wireless fidelity, Wi-Fi) module 670, a processor 680, and a power supply 690. A person skilled in the art may understand that the mobile phone structure shown in FIG. 6 does not constitute any limitation on the mobile phone, and the mobile phone may include components more or fewer than those shown in the figure, or a combination of some parts, or parts disposed differently.

The following specifically describes each component in the mobile phone with reference to FIG. 6.

The RF circuit 610 may be configured to receive and send signals in an information sending and receiving process or a call process, and particularly, receive downlink information from a base station, and then send the downlink information to the processor 680 for processing. In addition, the RF circuit 610 sends related uplink data to the base station. Generally, the RF circuit 610 includes but is not limited to an antenna, at least one amplifier, a transceiver, a coupler, a low noise amplifier (Low Noise Amplifier, LNA), a duplexer, and the like. In addition, the RF circuit 610 may communicate with a network and another device through wireless communication. The wireless communication may use any communication standard or protocol, including but not limited to global system for mobile communications (Global System of Mobile communication, GSM), general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), email, short message service (Short Messaging Service, SMS), and the like.

The memory 620 may be configured to store a software program and a module. The processor 680 executes various function applications of the mobile phone and processes data by running the software program and the module stored in the memory 620. The memory 620 may mainly include a program storage area and a data storage area. The program storage area may store an operating system, an application program required by at least one function (such as an audio play function or an image play function), and the like; and the data storage area may store data (such as audio data and a phone book) created based on use of the mobile phone, and the like. In addition, the memory 620 may include a high-speed random access memory, and may further include a non-volatile memory such as at least one disk storage device, a flash memory device, or another volatile solid-state storage device.

The input unit 630 may be configured to receive input digital or character information, and generate a key signal input related to user settings and function control of the mobile phone. Specifically, the input unit 630 may include a touch panel 631 and other input devices 632. The touch panel 631, also referred to as a touchscreen, may collect a touch operation performed by a user on or near the touch panel 631 (for example, an operation performed by the user on or near the touch panel 631 by using any proper object or accessory such as a finger or a stylus), and drive a corresponding connection apparatus according to a preset program. Optionally, the touch panel 631 may include two parts: a touch detection apparatus and a touch controller. The touch detection device detects a touch orientation of the user, detects a signal brought by the touch operation, and transmits the signal to the touch controller. The touch controller receives touch information from the touch detection apparatus, converts the touch information into contact coordinates, and sends the contact coordinates to the processor 680, and can receive a command sent by the processor 680 and execute the command. In addition, the touch panel 631 may be implemented in various types, such as a resistive type, a capacitive type, an infrared type, and a surface acoustic wave type. In addition to the touch panel 631, the input unit 630 may include the other input devices 632. Specifically, the other input devices 632 may further include but are not limited to one or more of a physical keyboard, a function key (such as a volume control key or an on/off key), a trackball, a mouse, and a joystick.

The display unit 640 may be configured to display information input by the user, or information provided for the user, and various menus of the mobile phone. The display unit 640 may include a display panel 641. Optionally, the display panel 641 may be configured in a form of a liquid crystal display (Liquid Crystal Display, LCD), an organic light-emitting diode (Organic Light-Emitting Diode, OLED), or the like. Further, the touch panel 631 may cover the display panel 641. After detecting a touch operation on or near the touch panel 631, the touch panel 631 transmits a touch event to the processor 680 to determine a touch event type. Then, the processor 680 provides a corresponding visual output on the display panel 641 based on the touch event type. Although in FIG. 6, the touch panel 631 and the display panel 641 are used as two independent components to implement input and output functions of the mobile phone. However, in some embodiments, the touch panel 631 and the display panel 641 may be integrated to implement the input and output functions of the mobile phone.

The mobile phone may further include at least a type of sensor 650, such as a light sensor, a motion sensor, or another sensor. Specifically, the light sensor may include an ambient light sensor and a proximity sensor. The ambient light sensor may adjust luminance of the display panel 641 based on brightness of ambient light. The proximity sensor may turn off the display panel 641 and/or backlight when the mobile phone moves to the ear. As a type of motion sensor, an accelerometer sensor may detect magnitudes of acceleration in various directions (usually three axes), detect, in a static state, a magnitude and a direction of gravity, and may be used for an application that recognizes a posture of the mobile phone (for example, screen switching between a portrait mode and a landscape mode, a related game, and magnetometer posture calibration), a vibration identification-related function (for example, a pedometer or tapping), and the like. For another sensor that may be further disposed in the mobile phone, such as a gyroscope, a barometer, a hygrometer, a thermometer, or an infrared sensor, details are not described herein.

The audio circuit 660, a loudspeaker 661, and a microphone 662 may provide an audio interface between the user and the mobile phone. The audio circuit 660 may transmit an electrical signal converted from received audio data to the loudspeaker 661, and the loudspeaker 661 converts the electrical signal into a sound signal for output. In addition, the microphone 662 converts a received sound signal into an electrical signal, the audio circuit 660 receives the electrical signal and converts the electrical signal into audio data, and outputs the audio data to the processor 680 for processing; and processed audio data is sent to, for example, another mobile phone through the RF circuit 610, or the audio data is output to the memory 620 for further processing.

Wi-Fi is a short-range wireless transmission technology. The mobile phone can help, by using the Wi-Fi module 670, the user to receive and send emails, browse a web page, access streaming media, and the like, to provide wireless broadband internet access for the user. Although FIG. 6 shows the Wi-Fi module 670, it can be understood that the Wi-Fi module 670 is not a mandatory part of the mobile phone, and may be omitted based on a requirement without changing the essence scope of the present invention.

The processor 680 is a control center of the mobile phone, is connected to all parts of the entire mobile phone by using various interfaces and lines, and by running or executing the software program and/or module stored in the memory 620, and invoking data stored in the memory 620, performs various functions of the mobile phone and processes data, to perform overall monitoring on the mobile phone. Optionally, the processor 680 may include one or more processing units. Preferably, an application processor and a modem processor may be integrated into the processor 680. The application processor mainly processes an operating system, a user interface, an application, and the like. The modem processor mainly processes wireless communication. It can be understood that the foregoing modem processor may not be integrated into the processor 680.

The mobile phone further includes the power supply 690 (such as a battery) that supplies power to the components. Preferably, the power supply may be logically connected to the processor 680 through a power management system, to implement functions such as charging management, discharging management, and power consumption management through the power management system.

Although not shown, the mobile phone may further include a camera, a Bluetooth module, and the like, and details are not described herein.

In the embodiments of this application, the terminal in the foregoing embodiment may be based on the terminal structure shown in FIG. 6, and the processor 630 may execute a program instruction stored in the memory 640 to implement the method shown in the foregoing embodiment, and details are not described herein again.

All or some of the foregoing embodiments may be implemented by software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

What is claimed is:

1. A recommendation method, applied to a terminal comprising a rule platform having a system-level permission, wherein the recommendation method comprises:
   obtaining, by the rule platform, a first event;
   obtaining, by the rule platform, a first rule related to the first event from a rule base, wherein the rule platform comprises the rule base comprising a plurality of rules, wherein each of the rules comprises a condition, and wherein the first rule comprises a first condition and a second condition related to a user portrait;
   updating, by the rule platform, a first matching status of the first condition corresponding to the first event;
   updating, by the rule platform, a second matching status of the second condition based on the user portrait;
   displaying, by the terminal, a recommendation result corresponding to the first rule when the first matching status and the second matching status in the first rule indicates that matching is successful;
   periodically sending, by the terminal, a query request to a cloud server, wherein the query request queries whether the first rule is updated;
   receiving, by the terminal, an updated rule from the cloud server; and
   updating, by the terminal, the first rule related to the updated rule in the rule base.

2. The recommendation method of claim 1, wherein before obtaining the first rule related to the first event, the recommendation method further comprises:
   receiving, by the rule platform, the first rule from a first application; and
   storing, by the rule platform, the first rule to the rule base.

3. The recommendation method of claim 2, further comprising:
   sending, by the rule platform, the recommendation result to a second application; and
   displaying, by the second application, the recommendation result.

4. The recommendation method of claim 2, further comprising:
   storing, by the rule platform, the recommendation result;
   obtaining, by a second application, the recommendation result from the rule platform; and
   displaying, by the second application, the recommendation result.

5. The recommendation method of claim 1, wherein before displaying the recommendation result, the recommendation method further comprises:
   obtaining, by the rule platform, a current user portrait from a user portrait platform of the terminal; and
   updating, by the rule platform, the second matching status of the second condition based on the current user portrait.

6. The recommendation method of claim 1, further comprising displaying, by the terminal, the recommendation result corresponding to the first rule when matching statuses of all conditions in the first rule and a second rule indicate that matching is successful and a first priority of the first rule is higher than a second priority of the second rule, wherein the second rule is related to the first event.

7. The recommendation method of claim 1, wherein the rule platform further comprises an interface layer and a rule engine, and wherein the recommendation method further comprises:
   obtaining, by the interface layer, the first event;
   obtaining, by a rule status processor of the rule engine and from the rule base, the first rule related to the first event;
   updating, by the rule status processor, the first matching status of the first condition corresponding to the first event in the first rule related to the first event;
   storing, by a personal knowledge base of the rule engine, the first event and the first matching status of the first condition in the first rule related to the first event;
   obtaining, by the personal knowledge base, a current user portrait from a user portrait platform;
   updating, by the personal knowledge base, the second matching status of the second condition based on the current user portrait;
   storing, by a recommendation result candidate set of the rule engine, the recommendation result corresponding to the first rule when the first matching status and the second matching status in the first rule indicates that the matching is successful; and
   displaying, by a graphical user interface, the recommendation result.

8. A terminal comprising:
   a rule platform comprising:
      a system-level permission;
      an interface layer configured to obtain a first event; and
      a rule engine coupled to the interface layer and comprising:
         a personal knowledge base configured to store the first event;
         a rule base comprising a plurality of rules, wherein each of the rules comprises a condition; and
         a rule status processor coupled to the personal knowledge base and the rule base and, configured to:
            obtain a first rule related to the first event from the rule base, wherein the first rule comprises a first condition and a second condition related to a user portrait;
            update a first matching status of a first condition corresponding to the first event in the first rule related to the first event;
            update a second matching status of the second condition based on the user portrait;
            record the matching status in the personal knowledge base; and
            output a recommendation result corresponding to the first rule when the first matching status and the second matching status in the first rule indicates that matching is successful,
         wherein the personal knowledge base is further configured to store the matching status and the second matching status in the first rule related to the first event, and
         wherein the rule base is configured to:
            periodically send a query request to a cloud server, wherein the query request queries whether the first rule is updated;
            receive, through the interface layer, an updated rule from the cloud server; and
            update the first rule related to the updated rule in the rule base; and
      a graphical user interface coupled to the rule platform and configured to display the recommendation result.

9. The terminal of claim 8, wherein the interface layer is further configured to:
   receive the first rule from a first application; and
   store the first rule to the rule base.

10. The terminal of claim 9, wherein the rule status processor is further configured to send the recommendation result to a second application, and wherein the graphical user interface is further configured to display the recommendation result using the second application.

11. The terminal of claim 9, wherein the rule engine further comprises a recommendation result candidate set, wherein the rule status processor is further configured to output the recommendation result to the recommendation result candidate set, and wherein the graphical user interface is further configured to display the recommendation result obtained by a second application from the recommendation result candidate set.

12. The terminal of claim 8, further comprising a user portrait platform, wherein the personal knowledge base is further configured to:
   obtain a current user portrait from the user portrait platform of the terminal; and
   update the second matching status of the second condition based on the current user portrait.

13. A terminal comprising:
   a memory configured to store a rule base, wherein the rule base comprises a rule, and wherein each of the rule comprises a condition;
   a processor coupled to the memory and configured to:
      obtain a first event;
      obtain a first rule related to the first event from the rule base, wherein the first rule comprises a first condition and a second condition related to a user portrait;
      update a first matching status of a first condition corresponding to the first event in the first rule related to the first event;
      update a second matching status of the second condition based on the user portrait; and
      output a recommendation result corresponding to the first rule when the first matching status and the second matching status in the first rule indicates that matching is successful; and
   a display coupled to the processor and the memory and configured to display the recommendation result corresponding to the first rule,
   wherein the processor is further configured to:
      periodically send a query request to a cloud server, wherein the query request queries whether the first rule is updated;
      obtain an updated rule from the cloud server; and
      update the first rule related to the updated rule in the rule base.

14. The terminal of claim 13, wherein the processor is further configured to:
   receive the first rule from a first application; and
   store the first rule to the rule base.

15. The terminal of claim 14, wherein the processor is further configured to send the recommendation result to a second application, and wherein the display is further configured to display the recommendation result.

16. The terminal of claim 13, wherein the processor is further configured to send the recommendation result to the memory, wherein the memory is further configured to store the recommendation result, and wherein the display is further configured to:
  obtain the recommendation result from the memory; and
  display the recommendation result.

17. The terminal of claim 13, wherein the processor is further configured to:
  obtain a current user portrait from a user portrait platform of the terminal; and
  update the second matching status of the second condition based on the current user portrait.

18. The recommendation method of claim 1, further comprising obtaining, by the rule platform, the first rule and a second rule related to the first event from the rule base, wherein the first rule and the second rule comprises the first condition.

19. The recommendation method of claim 18, further comprising monitoring, by an interface layer in the rule platform, the first event only once for the first rule and the second rule.

20. The recommendation method of claim 18, further comprising randomly displaying a recommendation result corresponding to the first rule or the second rule.

* * * * *